(12) United States Patent  
Phillips et al.

(10) Patent No.: US 7,204,026 B2
(45) Date of Patent: Apr. 17, 2007

(54) ADJUSTABLE RECIPROCATING SAW

(75) Inventors: Alan Gene Phillips, Jackson, TN (US); John Walter Schnell, Jackson, TN (US); John Michael Beville, Jackson, TN (US); Jeffrey F. Schmitz, Asheville, NC (US)

(73) Assignee: Black & Decker, Inc., Newark, DE (US)

( * ) Notice: Subject to any disclaimer, the term of this patent is extended or adjusted under 35 U.S.C. 154(b) by 266 days.

(21) Appl. No.: 10/117,280

(22) Filed: Apr. 8, 2002

(65) Prior Publication Data

US 2003/0110646 A1 Jun. 19, 2003

Related U.S. Application Data

(63) Continuation of application No. 10/016,944, filed on Dec. 18, 2001, now Pat. No. 6,671,969.

(51) Int. Cl.
*B23D 40/00* (2006.01)

(52) U.S. Cl. .............................. 30/394; 30/340; 30/519

(58) Field of Classification Search .......... 30/392–394, 30/122, 340, 337–339, 330, 519; 285/148.21, 285/153.1
See application file for complete search history.

(56) References Cited

U.S. PATENT DOCUMENTS

| 1,281,214 | A | 10/1918 | Packwood et al. |
| 1,406,071 | A | 2/1922 | Pavelka |
| 1,539,068 | A | 5/1925 | Brockett |
| 1,539,069 | A | 5/1925 | Brockett |
| 1,793,053 | A | 5/1929 | Cahill et al. |
| 1,808,228 | A | 6/1931 | Hulack et al. |
| 1,816,246 | A | 7/1931 | Bittner |
| 1,978,369 | A | 10/1934 | Levin |
| 2,293,859 | A | 8/1942 | Scott |
| 2,337,769 | A | 12/1943 | Redenbo |
| 2,348,266 | A | 5/1944 | Selby |

(Continued)

FOREIGN PATENT DOCUMENTS

DE 31 14 906 A1 10/1982

(Continued)

OTHER PUBLICATIONS

"New Compact Cordless Sawzall the Hatched," from the website <www.mil-electric.com>, printed on Sep. 10, 2001.

(Continued)

*Primary Examiner*—Timothy V. Eley
*Assistant Examiner*—Issac N Hamilton
(74) *Attorney, Agent, or Firm*—Hunton & Williams

(57) ABSTRACT

An adjustable reciprocating saw has the ability to adjust the orientation of the saw blade in relation to the rest of the tool. The saw blade can pivot about two transverse axes, one parallel with and one perpendicular to the reciprocating motion axis of the saw blade. The portions of the saw's housing which rotate relative to one another are attached with a rotating joint comprising a pin and groove design. Rotation locks selectively prevent rotation of the saw blade about each axis. The rotation locks can be released through simply depressing buttons on the saw. A rear internal bearing increases the durability and decreases the size of the saw. A keyless adjustable shoe is mounted to the saw.

21 Claims, 23 Drawing Sheets

U.S. PATENT DOCUMENTS

| | | | |
|---|---|---|---|
| 2,414,637 A | 1/1947 | Crump |
| 2,430,422 A | 11/1947 | Happe |
| 2,435,225 A | 2/1948 | Kolodner et al. |
| 2,436,692 A | 2/1948 | Greene |
| 2,548,411 A | 4/1951 | Vaché |
| 2,619,132 A | 11/1952 | Pierce |
| 2,621,689 A | 12/1952 | Fordon |
| 2,783,790 A | 3/1957 | Keesling |
| 2,793,661 A | 5/1957 | Olson |
| 2,966,931 A | 1/1961 | Dreier |
| 2,984,757 A | 5/1961 | Papworth |
| 3,028,890 A | 4/1962 | Atkinson et al. |
| D194,736 S | 2/1963 | Godfrey et al. |
| 3,156,837 A | 11/1964 | Weller et al. |
| D214,987 S | 8/1969 | Ballone et al. |
| 3,494,391 A | 2/1970 | Mango |
| 3,496,972 A | 2/1970 | Rees |
| 3,547,166 A | 12/1970 | Dudek |
| 3,555,678 A | 1/1971 | Agulnick et al. |
| 3,580,342 A | 5/1971 | Matthews |
| 3,585,719 A | 6/1971 | Kivela |
| 3,757,194 A | 9/1973 | Weber |
| 3,758,053 A | 1/1974 | Michaelson |
| 3,785,053 A | 1/1974 | Michaelson |
| 3,793,782 A | 2/1974 | Bowling |
| 3,802,079 A | 4/1974 | Ketchpel, Jr. et al. |
| 3,876,015 A * | 4/1975 | Kivela ............... 173/170 |
| 3,892,158 A | 7/1975 | Smeets |
| 3,893,240 A | 7/1975 | Morner et al. |
| 3,971,132 A | 7/1976 | Griffies et al. |
| 4,137,632 A | 2/1979 | Pfanzer |
| 4,283,855 A | 8/1981 | Nalley |
| 4,353,425 A | 10/1982 | Simpson |
| 4,379,362 A | 4/1983 | Getts |
| 4,462,282 A | 7/1984 | Biek |
| 4,522,270 A | 6/1985 | Kishi |
| 4,545,123 A | 10/1985 | Hartmann |
| 4,693,009 A * | 9/1987 | Bone ............... 30/392 |
| 4,727,941 A | 3/1988 | Fulton |
| 4,759,240 A | 7/1988 | Lin |
| 4,785,540 A | 11/1988 | Arvidsson |
| 4,819,334 A | 4/1989 | Mongeon |
| 4,912,349 A | 3/1990 | Chang |
| 4,976,173 A | 12/1990 | Yang |
| 4,991,298 A | 2/1991 | Matre |
| 5,006,740 A | 4/1991 | Palm |
| 5,007,172 A | 4/1991 | Palm |
| 5,038,523 A | 8/1991 | Farber et al. |
| 5,065,476 A | 11/1991 | Dohse et al. |
| 5,079,844 A | 1/1992 | Palm |
| 5,083,376 A | 1/1992 | Lentino |
| 5,089,738 A | 2/1992 | Bergqvist |
| 5,165,173 A | 11/1992 | Miller |
| 5,193,281 A | 3/1993 | Kasten |
| 5,201,146 A | 4/1993 | Fushiya |
| 5,212,887 A | 5/1993 | Farmerie |
| 5,339,572 A | 8/1994 | Eicher |
| 5,341,704 A | 8/1994 | Klemm |
| D351,544 S | 10/1994 | Izumisawa |
| 5,375,666 A | 12/1994 | Pettet |
| 5,398,454 A | 3/1995 | Quirijnen et al. |
| 5,407,381 A | 4/1995 | Schaefer et al. |
| 5,421,091 A | 6/1995 | Gerritsen, Jr. |
| 5,466,183 A | 11/1995 | Kirn et al. |
| 5,533,581 A | 7/1996 | Barth et al. |
| 5,575,071 A | 11/1996 | Phillips et al. |
| D377,303 S | 1/1997 | Nagel |
| 5,596,810 A | 1/1997 | Neubert et al. |
| 5,681,214 A | 10/1997 | Kleider et al. |
| 5,687,802 A | 11/1997 | Spooner et al. |
| 5,697,158 A | 12/1997 | Klinzing et al. |
| 5,730,561 A * | 3/1998 | Wambeke ............... 30/122 X |
| 5,755,293 A | 5/1998 | Bourke |
| 5,778,649 A | 7/1998 | Losdahl |
| 5,832,611 A | 11/1998 | Schmitz |
| 5,924,497 A | 7/1999 | Spooner et al. |
| 5,940,977 A | 8/1999 | Moores, Jr. |
| 5,946,810 A * | 9/1999 | Hoelderlin et al. ............ 30/392 |
| D418,729 S | 1/2000 | Snider |
| 6,048,260 A | 4/2000 | Kopras |
| 6,102,134 A | 8/2000 | Alsruhe |
| 6,108,867 A | 8/2000 | Nagashima |
| 6,108,916 A | 8/2000 | Zeiler et al. |
| 6,138,364 A * | 10/2000 | Schmitz ............... 30/392 |
| 6,139,359 A | 10/2000 | Fuhreck et al. |
| 6,164,707 A * | 12/2000 | Ungchusri et al. ........... 285/276 |
| D437,199 S | 2/2001 | Robson |
| 6,212,781 B1 | 4/2001 | Marinkovich et al. |
| RE37,211 E | 6/2001 | Bednar et al. |
| D443,491 S | 6/2001 | Robson |
| 6,241,594 B1 | 6/2001 | Lepold |
| 6,263,979 B1 | 7/2001 | Dyke et al. |
| 6,272,757 B1 | 8/2001 | Roe |
| D447,924 S | 9/2001 | Neitzell et al. |
| 6,282,797 B1 | 9/2001 | Osada et al. |
| 6,293,859 B1 | 9/2001 | Fink et al. |
| 6,301,790 B1 | 10/2001 | Zeiler et al. |
| 6,308,423 B1 | 10/2001 | Ono |
| D454,476 S | 3/2002 | Bruno |
| 6,357,125 B1 | 3/2002 | Feldmann |
| D455,328 S | 4/2002 | Bruno |
| 6,364,033 B1 | 4/2002 | Hung et al. |
| 6,439,088 B1 | 8/2002 | Eytchison |
| 8,467,177 | 10/2002 | Eichberger |
| 6,502,647 B1 | 1/2003 | Krzyzewski et al. |
| 6,527,630 B2 | 3/2003 | Mannsperger et al. |
| 6,568,089 B1 | 5/2003 | Popik et al. |
| D475,907 S | 6/2003 | Neitzell et al. |
| 6,588,112 B2 | 7/2003 | Zeiler et al. |
| 6,602,122 B1 | 8/2003 | Rudolf et al. |
| 6,671,969 B2 | 1/2004 | Phillips et al. |
| 6,701,622 B2 | 3/2004 | Covell et al. |
| 6,810,589 B2 | 11/2004 | Lagaly et al. |
| 2001/0034942 A1 | 11/2001 | Marinkovich et al. |
| 2002/0178591 A1* | 12/2002 | Hechr et al. ............... 30/392 |
| 2003/0002937 A1 | 1/2003 | Miura |
| 2003/0009888 A1 | 1/2003 | Marinkovich et al. |
| 2003/0095842 A1 | 5/2003 | Bone |
| 2003/0101600 A1 | 6/2003 | James et al. |
| 2003/0140507 A1 | 7/2003 | Lagaly et al. |
| 2004/0016134 A1 | 1/2004 | Bednar |
| 2004/0117992 A2 | 6/2004 | Bednar |
| 2004/0187322 A2 | 9/2004 | Bednar |
| 2005/0000097 A2 | 1/2005 | Bednar |

FOREIGN PATENT DOCUMENTS

| | | |
|---|---|---|
| DE | 39 21 752 A1 | 1/1991 |
| DE | 40 21 277 A1 | 3/1991 |
| DE | 41 02 421 A1 | 7/1992 |
| DE | 41 02 482 A1 | 7/1992 |
| DE | 41 02 483 A1 | 7/1992 |
| DE | 41 02 838 A1 | 8/1992 |
| DE | 42 03 171 C1 | 6/1993 |
| DE | 44 22 245 A1 | 1/1996 |
| DE | 195 32 299 C2 | 3/1997 |
| DE | 195 46 328 A1 | 6/1997 |
| DE | 198 21 145 C2 | 12/1998 |
| EP | 0 422 773 | 4/1991 |
| EP | 0 267 472 B1 | 4/1992 |
| EP | 0 539 382 B1 | 10/1994 |
| EP | 0 493 033 B1 | 2/1996 |
| EP | 0 768 138 A2 | 10/1996 |
| EP | 1 016 505 A2 | 11/1999 |

| | | |
|---|---|---|
| EP | 1 203 628 | 5/2002 |
| EP | 1 327 497 A2 | 7/2003 |
| EP | 1 344 789 A2 | 8/2003 |
| EP | 1 378 324 A1 | 1/2004 |
| GB | 2026928 | 5/1979 |
| JP | 58-61171 | 4/1983 |
| JP | 1-281880 A | 12/1988 |
| JP | 03-2336 | 1/1991 |
| JP | 3-4001 B2 | 1/1991 |
| JP | 4-223861 | 8/1992 |
| JP | 06-114804 | 4/1994 |
| JP | 06-143119 | 5/1994 |
| JP | 6-25291 Y2 | 7/1994 |
| JP | 07-156079 | 6/1995 |
| JP | 7-285060 | 10/1995 |
| JP | 09-183083 | 7/1997 |
| JP | 09-290379 | 11/1997 |
| JP | 10-166283 | 6/1998 |
| JP | 2001-277155 | 10/2001 |
| WO | WO 92/01535 | 2/1992 |
| WO | WO 92/12823 | 8/1992 |
| WO | WO 92/12824 | 8/1992 |
| WO | WO 92/12825 | 8/1992 |
| WO | WO 92/13678 | 8/1992 |
| WO | WO 94/00264 | 1/1994 |
| WO | WO 97/10929 | 3/1997 |

OTHER PUBLICATIONS

"Sawzall—The Hatchet, Built for tight spaces," "The Hatchet evolution . . . How YOU drive our new tool development," "How to choose a Sawzall," "Cut your job down to size with the righst Sawzall bladel," Milwaukee Heavy-Duty Club Tool-Gram, No. Mar. 2001.

Porter-Cable 2000-2001 Product Catalog, p. 46, description and picture of Porter-Cable model No. 7414 angle grinder.

Parts diagram for Porter-Cable model No. 7414 angle grinder, 2000.

Parts diagram for Porter-Cable model No. 7415 angle grinder, 2001.

Milwaukee Electric Tool Corp., Operator's Manual for 18 Volt Sawzall Hatchet, Catalog No. 6514, Sep. 2003, 28 pages.

Milwaukee Electric Tool Corp., Service Parts List, Cordless 18 Volt Hatchet Sawzall, Catalog No. 6514-20, Bulletin No. 54-40-6500, Apr. 2002, 2 pages.

Milwaukee Electric Tool Corp., Service Parts List, Cordless 18 Volt Hatchet Sawzall, Catalog No. 6514-50, Bulletin No. 55-40-6500, Apr. 2002, 2 pages.

Milwaukee Electric Tool Corp., Wiring Instructions, Cordless Hatchet Sawzall, Bulletin No. 58-01-1900, Sep. 2001, 1 page.

Milwaukee Electric Tool Corp., Heavy-Duty Tool-Gram, No. 3-2001, "Sawzall-The Hatchet," 4 pages.

Milwaukee Electric Tool Corp., Service Parts List for Super Hawg, Catalog No. 1680-20, Bulletin No. 54-10-0250, Sep. 2003, 2 pages.

Milwaukee Electric Tool Corp., Operator's Manual for "Heavy-Duty SuperHawg," Catalog No. 1680-20, No. 58-14-1700d4, Nov. 2004, 28 pages.

Milwaukee Electric Tool Corp., Press Release Archive, "Compact Cordless Sawzall The Hatchet," Sep. 10, 2001, 2 pages.

Porter-Cable Corp., Instruction Manual, Double Insulated Variable Speed TIGER SAW All-Purpose Saws, 15 pages, Copyright 2003 Porter Cable Corporation.

* cited by examiner

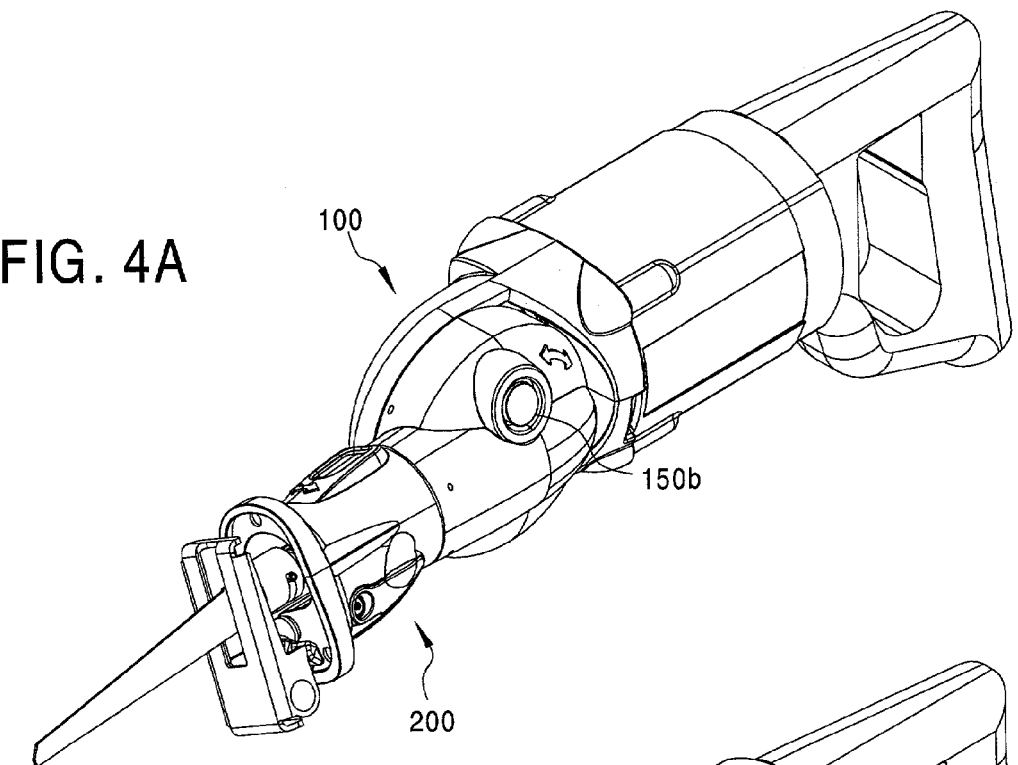
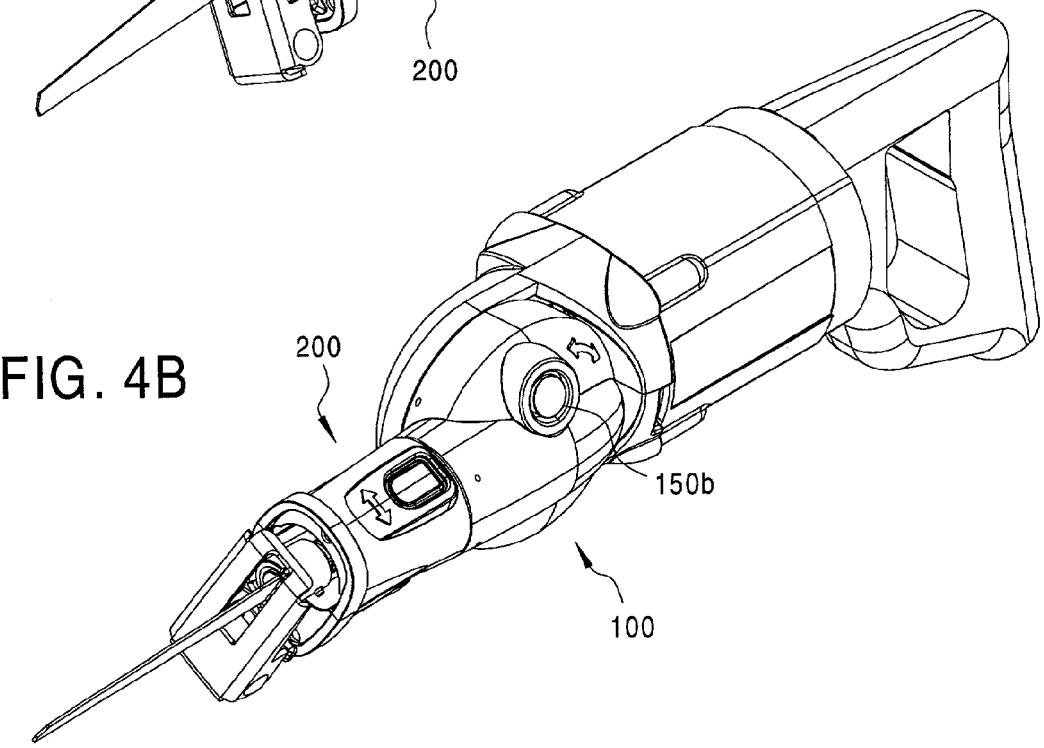

Locked

Unlocked

ADJUSTABLE RECIPROCATING SAW

This application is a continuation of U.S. patent application Ser. No. 10/016,944 filed Dec. 18, 2001 now U.S. Pat. No. 6,671,969.

BACKGROUND OF THE INVENTION

1. Field of the Invention

The field of this invention is power tools, and more particularly reciprocating saws.

2. Description of Related Art

Reciprocating saws have long been offered by power tool manufacturers and are especially useful to tradesmen in the building industry. Tradesmen such as carpenters, plumbers, electricians, HVAC mechanics, and central vacuuming system installers use reciprocating saws to make cuts in wood, plastic, and metal materials while accomplishing an infinite variety of tasks. The ample power, durability, and ease of use which are characteristic of reciprocating saws make them a versatile tool well suited to accomplish many different jobs.

Despite the versatility already possessed by reciprocating saws, the reciprocating saw is not well suited for every task a tradesmen faces. Traditional reciprocating saws are often not useful where only limited maneuvering space is available around the workpiece to be cut. Traditional reciprocating saws are relatively long tools. The saw blade, reciprocating mechanism, motor and handle are typically positioned longitudinally in-line with one another—the Cordless Tiger Saw from Porter-Cable, described in U.S. patent application Ser. No. 09/627,780, being a notable and rare departure from this configuration. Because of their length, traditional reciprocating saws are difficult to use in cramped quarters. As one example, traditional reciprocating saws are difficult to use inside of a cabinet. Given the limited maneuvering space inside the cabinet and a relatively long saw, the user often cannot maneuver the saw into position so that the blade can move along the cutting path. When this is the case, then resort must be made to another power tool, or to a hand tool. For another example, plumbers and HVAC mechanics often need to make cuts in floor joists which are spaced 16 inches on center. The length of most traditional reciprocating saws greatly hampers these cuts because the saw cannot fit perpendicularly between the joists. As a final example, plumbers sometimes need to cut a pipe even with or below a surface. With a traditional reciprocating saw, a plumber would be forced to excavate a large hole below the surface in order to position the saw perpendicular to the pipe with the saw blade adjacent the cut. The excavation of such a hole is time consuming and costly for the plumber. These examples show how the length of traditional reciprocating saws can hamper or even prevent its use for some tasks.

The configuration of traditional reciprocating saws can sometimes make their use awkward and uncomfortable. The configuration of a traditional reciprocating saw does not provide adequate leverage to control fine cutting by the saw blade. Because the handle is in line with the reciprocating motion of the saw blade, only a small moment can be developed to help turn the saw blade during a cut. Partially for this reason, it is often difficult to make small radius cuts or to closely follow a fine cutting line with a traditional reciprocating saw.

The lack of adjustability of traditional reciprocating saws can impede their use. A traditional reciprocating saw only cuts when the saw blade is moved against the workpiece in one direction. Because the saw has only one direction of cut and no provision to adjust the configuration of the saw blade relative to the body and handle of the saw, the user must sometimes hold the saw in an awkward and uncomfortable position. Further, some cuts with a traditional reciprocating saw are prevented because of obstacles which block access to the workpiece even when maneuvering space is otherwise available. If the reciprocating saw were capable of "bending" around the obstacle, the cut could be made.

Several manufacturers and individuals have suggested modifications to the traditional reciprocating saw to overcome some of the drawbacks mentioned above. Notable among these are the inventions disclosed in U.S. Pat. No. 6,138,364 to Jeffrey Schmitz, U.S. Pat. No. 5,940,977 to Robert Moores, Jr., and U.S. Pat. No. 3,585,719 to Stanley Kivela. None, however, provide the versatility of the reciprocating saw of the present invention.

SUMMARY OF THE INVENTION

The present invention seeks to increase the versatility of a reciprocating saw to perform an even greater number of tasks by permitting adjustment of the reciprocating saw's configuration. In one embodiment of the adjustable reciprocating saw disclosed herein, the saw blade is continuously adjustable about two transverse rotational axes. This allows the saw blade to be adjusted to a wide range of positions relative to the saw. This adjustability can be highly beneficial when cutting in confined spaces and with obstacles, when closely following cutting lines, and when cutting small radius curves, among other situations often faced by tradesmen. The present invention also seeks to maintain or even improve the compactness, power, and durability of reciprocating saws.

In one embodiment of the invention, a reciprocating shaft and bearing combination for a reciprocating saw comprises a bearing mounted to the saw, a reciprocating shaft having a blade holder at a first end thereof for holding a saw blade, the reciprocating shaft having a reciprocating motion relative to the bearing defining a reciprocating motion axis, the reciprocating shaft also having a bore formed in a second end opposite the first end, and the bore being formed parallel to the reciprocating motion axis and a first end of the bearing being positioned inside the bore. The combination further comprises a first bearing surface formed on the bearing, and a second bearing surface formed on the bore. The first bearing surface supports the second bearing surface for sliding movement there between.

In another embodiment of the invention, a reciprocating saw comprises a saw blade extending from the saw and having a reciprocating motion, a shoe for bearing against a workpiece, the shoe extending from the saw adjacent the saw blade, the shoe mounted to a post slidably received in a bore in the saw, and a locking mechanism rotatably mounted to the saw for locking the post to the saw, the locking mechanism being rotatable with respect to the saw about a rotational axis, the locking mechanism having at least one protrusion at an axial end thereof extending axially away from the locking mechanism. In a first rotational position, the at least one protrusion engages a detent in the post so that the post is locked relative to the saw, and in a second rotational position the at least one protrusion does not engage the detent so that the post can slide in the bore relative to the saw blade.

In another embodiment of the invention, a reciprocating saw comprises a rotary motor, a reciprocating mechanism for converting rotary motion of the rotary motor into reciprocating motion, a stationary housing portion, a scroll housing portion rotatably mounted to the stationary housing portion, and a reciprocating shaft having a reciprocating motion relative to the scroll housing portion, the reciprocating motion being driven by the reciprocating mechanism and defining a reciprocating motion axis. The reciprocating shaft comprises a first end extending from the scroll housing portion, and a blade holder for holding a saw blade, the blade holder being mounted on the first end. The scroll housing portion rotates relative to the stationary housing portion and the reciprocating mechanism about a first axis of rotation which is substantially parallel to the reciprocating motion axis, the rotation of the scroll housing portion causing the saw blade to rotate in unison therewith.

In another embodiment of the invention, a power tool comprises a stationary housing portion and a movable housing portion mounted to the stationary housing portion for rotation about an axis of rotation. One of the stationary housing portion or the movable housing portion has a radial flange centered on the axis of rotation and extending at least part way around the axis of rotation, and the other of the stationary housing portion or the movable housing portion has one or more locking pieces detachably mounted thereon. The one or more locking pieces each engage the flange thereby blocking relative axial movement of the stationary housing portion away from the movable housing portion while permitting relative rotational movement of the stationary housing portion and the movable housing portion. When the one or more locking pieces are detached from the other of the stationary housing portion or the movable housing portion, the stationary housing portion and the movable housing portion can be disassembled from one another.

In another embodiment, a method of fastening first and second housing portions of a power tool where the first and second housing portions rotate relative to one another comprises the steps of assembling the first and second housing portions together so that bearing surfaces formed on each are engaged with one another, and mounting one or more locking pieces onto one of the first or second housing portions without the use of separate removable fasteners so that the locking pieces engage a surface formed on the other of the first or second housing portions thereby permitting relative rotational movement between the first and second housing portions about an axis of rotation and blocking relative axially movement of the first housing portion away from the second housing portion.

In another embodiment, a saw comprises a reciprocating mechanism for producing a reciprocating motion, and a reciprocating shaft having a reciprocating motion driven by the reciprocating mechanism. The reciprocating shaft comprises a blade holder proximate a first end, a first flange integrally formed with the reciprocating shaft proximate a second end opposite the first end. A second flange is selectively detachably mounted to the reciprocating shaft. A portion of the reciprocating mechanism alternately pushes against the first and second flanges when the reciprocating mechanism is driving the reciprocating shaft, and the first and second flanges cooperate to trap there between the portion of the reciprocating mechanism.

In another embodiment, a saw comprises a reciprocating shaft having a reciprocating motion, the reciprocating shaft comprising a blade holder on one end thereof, and a reciprocating mechanism for driving the reciprocating shaft in its reciprocating motion, the reciprocating mechanism comprising a yoke. One of the reciprocating shaft or the yoke has a first locking flange integrally formed therewith, and a second locking flange selectively detachably mounted thereto. The first locking flange and the second locking flange alternately engage a portion of the other of the reciprocating shaft or the yoke to transfer a force there between thereby driving the reciprocating shaft in its reciprocating motion, and the first and second locking flanges cooperate to trap there between the portion of the other of the reciprocating shaft or the yoke.

In another embodiment, a power tool comprises a stationary housing portion, a movable housing portion mounted to the stationary housing portion for rotation about an axis of rotation, and a locking system for preventing rotation of the movable housing portion relative to the stationary housing portion. The locking system comprises a plurality of angularly spaced detents radially formed at least part way around the axis of rotation on one of the stationary housing portion or the movable housing portion, and a locking mechanism mounted to the other of the stationary housing portion or the movable housing portion to be movable between first and second positions wherein when in the first position, the locking mechanism engages one of the detents, and in a second position, the locking mechanism bypasses at least one of the detents allowing relative rotation between the stationary housing portion and the movable housing portion. The locking mechanism is actuated to move between its first and second position by the hand of a user of the power tool.

In another embodiment, a saw comprises a first housing portion having a handle portion with a trigger switch for actuating the saw, a second housing portion mounted to the first housing portion, and a reciprocating shaft extending from the second housing portion, the reciprocating shaft having a blade holder with a saw blade mounted thereon, and the reciprocating shaft having a reciprocating motion defining a reciprocating motion axis. The saw blade is rotatable relative to the first housing portion about a first rotational axis generally perpendicular to the reciprocating motion axis, and the saw blade is continuously rotatable relative to the first housing portion about a second rotational axis generally parallel with the reciprocating motion axis.

In another embodiment, a reciprocating saw comprises a first housing having a handle portion and a motor portion for mounting a rotary electric motor, a second housing rotationally mounted to the first housing, a third housing rotationally mounted to the second housing, and a reciprocating shaft extending out from the third housing, the reciprocating shaft having a reciprocating motion defining a reciprocating motion axis. The second housing is rotationally mounted to the first housing about a first axis of rotation substantially perpendicular to the reciprocating motion axis, and the third housing is rotationally mounted to the second housing about a second axis of rotation substantially parallel to the reciprocating motion axis.

In another embodiment, a saw comprises a first housing portion having a handle portion with a trigger switch for actuating the saw, a second housing portion mounted to the first housing portion, and a reciprocating shaft extending from the second housing portion, the reciprocating shaft having a blade holder with a saw blade mounted thereon, and the reciprocating shaft having a reciprocating motion defining a reciprocating motion axis. The saw blade is rotatable relative to the first housing portion about a rotational axis generally perpendicular to the reciprocating motion axis when a button mounted on one of the first or second housing portions is depressed.

In another embodiment, a method of adjusting a reciprocating saw—the reciprocating saw comprising a first housing portion having a handle portion with a trigger switch for actuating the saw, a second housing portion mounted to the first housing portion, and a reciprocating shaft extending from the second housing portion, the reciprocating shaft having a blade holder with a saw blade mounted thereon, and the reciprocating shaft having a reciprocating motion defining a reciprocating motion axis-comprises the steps of depressing a button thereby permitting rotation of the saw blade relative to the first housing about a rotational axis generally perpendicular to the reciprocating motion axis, rotating the saw blade about the rotational axis, and releasing the button causing the saw blade to be locked relative to the first housing about the rotational axis.

BRIEF DESCRIPTION OF THE DRAWINGS

FIGS. 4A and 4B are isometric views of the saw of FIG. 1 with the scroll assembly adjusted to two different scroll angles.

DETAILED DESCRIPTION

To illustrate the invention, a preferred embodiment of a reciprocating saw which is a composite of all of the individual features of the invention will be described in detail. However, each of the individual features of the invention may be used separately or in combination with only some of the other features, as will be recognized by those skilled in the art. The scope of protection of the invention is not intended to be limited to a saw embodying all or most of the individual features of the invention, but encompasses any saw which incorporates any of the individual features of the invention as separately recited in the appended claims.

The term reciprocating saw as used herein shall be construed to mean any saw with a saw blade that has at least a back-and-forth, i.e., reciprocating, motion in a direction generally parallel to the longitudinal axis of the saw blade. Thus, for example, orbital action saws having more than one component of motion are reciprocating saws since they have at least a reciprocating motion in a direction generally parallel to the longitudinal axis of the saw blade.

Figure 1:
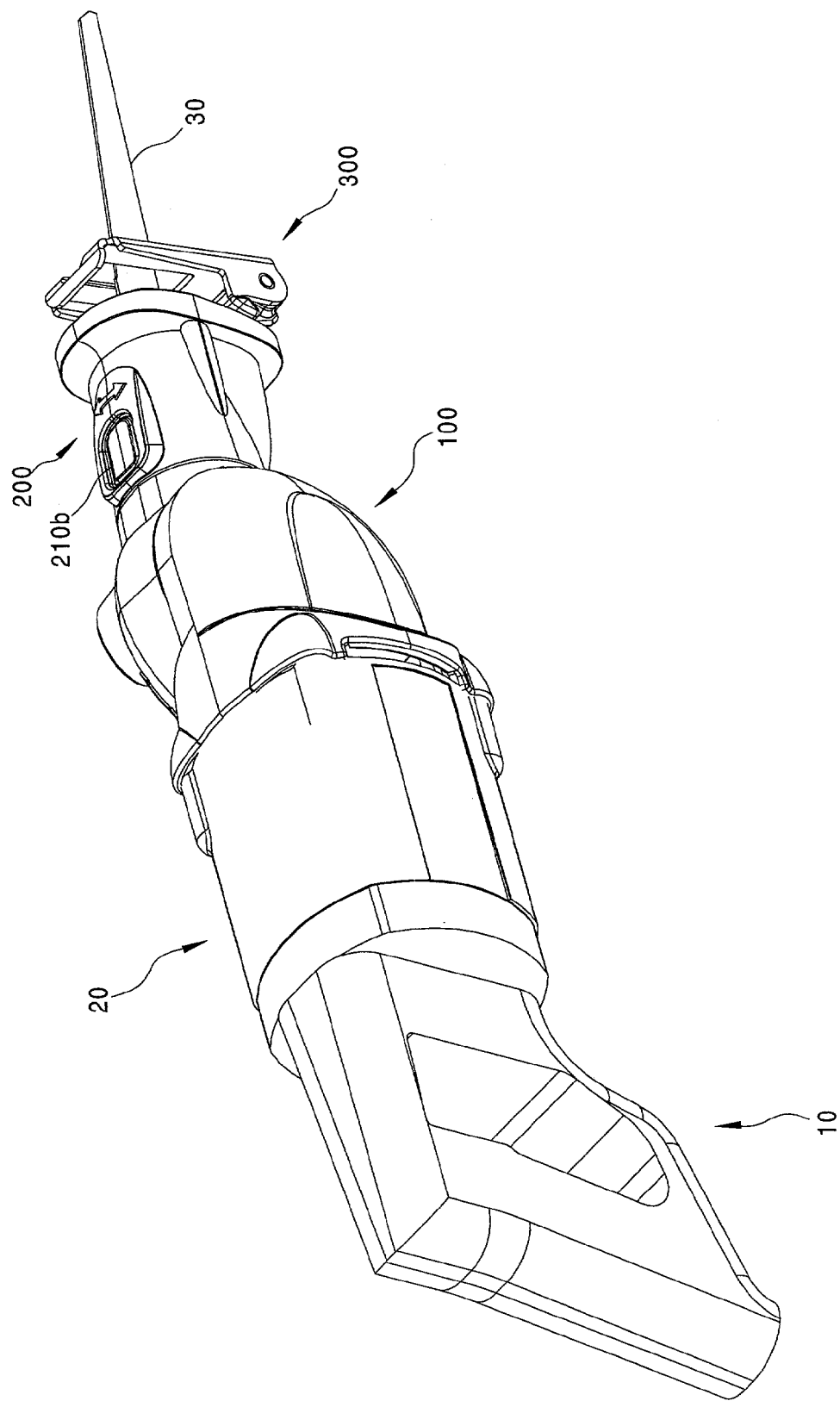
FIG. 1 is an isometric view of an adjustable reciprocating saw according to one embodiment.
Figure 2:
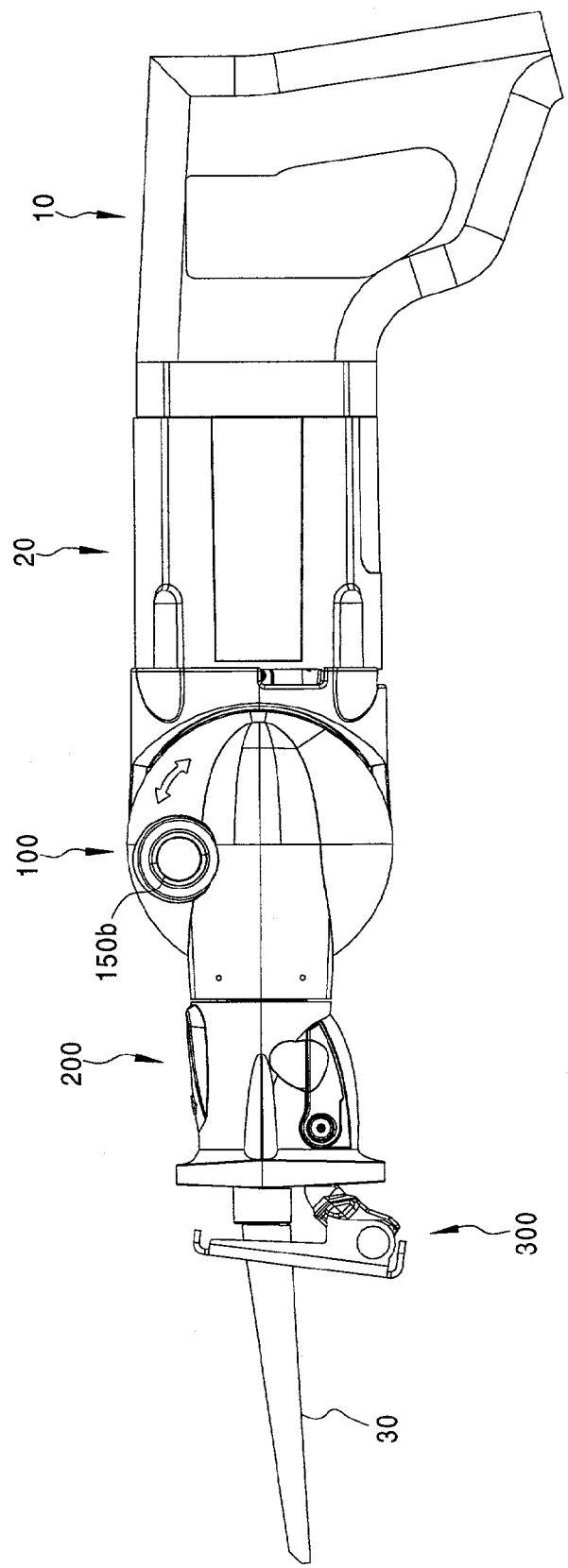
FIG. 2 is a front view of the saw of FIG. 1.

FIGS. 1 and 2 depict an adjustable reciprocating saw according to one embodiment of the invention. The major components of the adjustable reciprocating saw include a handle assembly 10 and a motor assembly 20. The handle assembly 10 and the motor assembly 20 are depicted schematically since their details are not important for understanding the invention. In fact, the handle assembly 10 and the motor assembly 20 could be of any appropriate design, as will be recognized by those skilled in the art. Typically, the handle assembly 10 will include a trigger switch for actuating the tool, and possibly a trigger lock. The motor assembly 20 includes a rotary electric motor. Either a cordset or a battery attaches to the handle assembly 10 or the motor assembly 20 to provide power to the motor.

A saw blade 30 extends from the saw and has a reciprocating motion which defines a reciprocating motion axis. The reciprocating motion axis is generally parallel to the saw blade's longitudinal axis. In addition, the saw blade 30 may have other components of motion such as occurs in an orbital action reciprocating saw. A shoe assembly 300 rests against the workpiece being cut to help stabilize the saw.

A pivot assembly 100 and a scroll assembly 200 permit the orientation of saw blade 30 to be adjusted to an infinite number of positions within a large range. This adjustability greatly facilitates use of the saw in some conditions, and can even make possible otherwise impossible tasks.

Figure 3A:
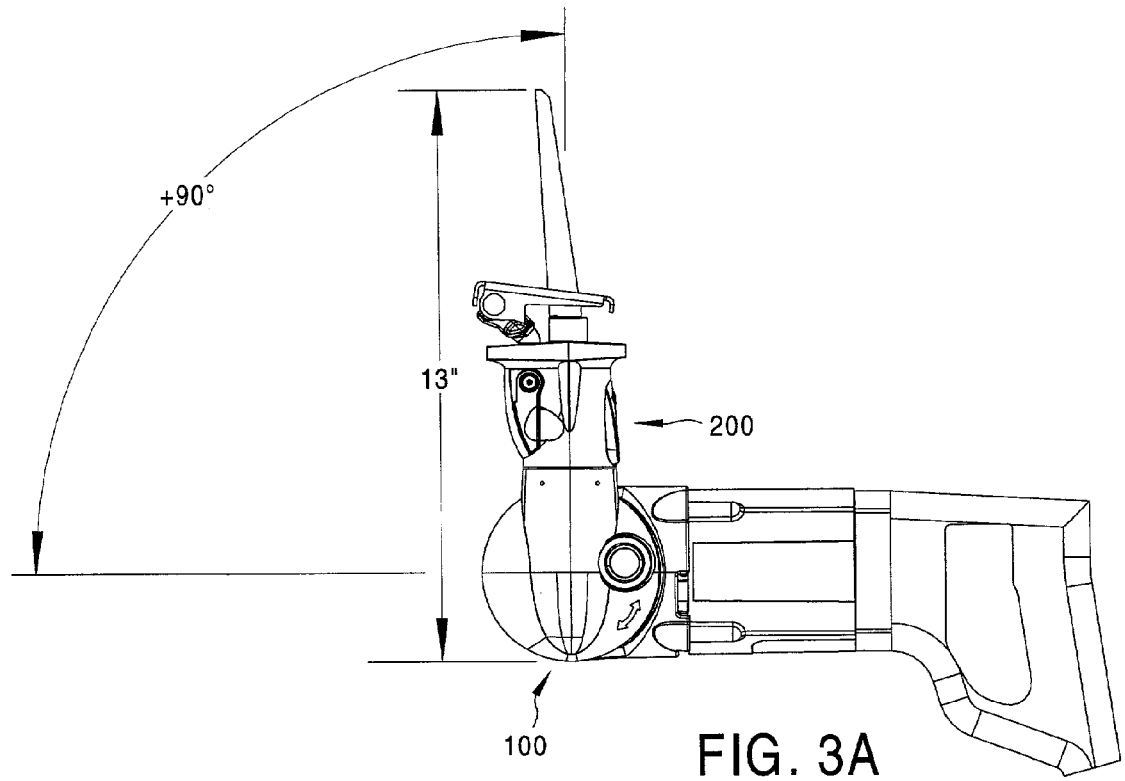
FIGS. 3A and 3B are front views of the saw of FIG. 1 with the pivot assembly adjusted to two different pivot angles.
Figure 3B:
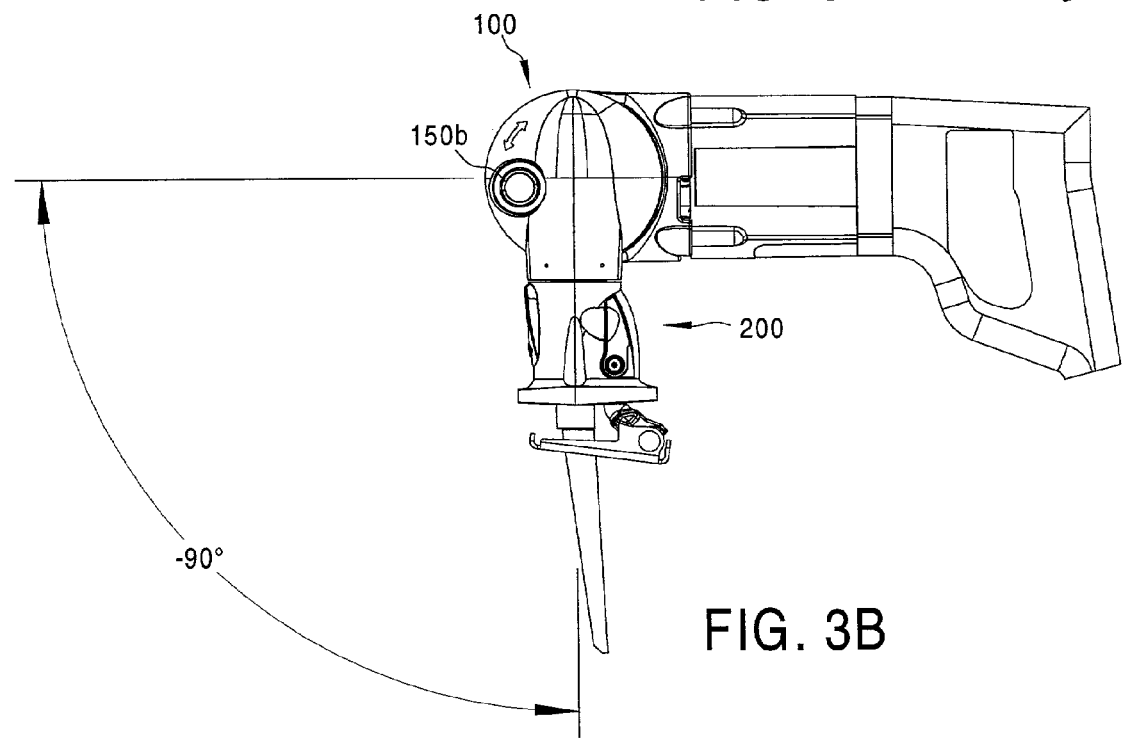

The pivot assembly 100 permits the saw blade 30 to pivot about a rotational axis generally perpendicular to the reciprocating motion axis. FIGS. 3A and 3B show the saw with the pivot assembly 100 adjusted to two different positions. FIG. 3A depicts the saw in an orientation with a +90° pivot angle. FIG. 3B depicts the saw in an orientation with a −90° pivot angle. Thus, the pivot assembly 100 of this embodiment permits a range of pivoting of 180°.

The scroll assembly 200 permits the saw blade 30 to rotate about a rotational axis generally parallel to the reciprocating motion axis. This rotation is called scrolling. FIGS. 4A and 4B show the saw with the scroll assembly 200 adjusted to two different scroll angles. The scroll assembly 200 of this embodiment permits an infinite range of scrolling. In other words, the saw blade can be scrolled endlessly in either direction.

The scroll assembly 200 permits the saw blade 30 to scroll continuously in this embodiment. Continuous scrolling means that the saw blade 30 can be rotated to an infinite number of scroll angles within its range of scroll adjustability. Prior art saws, such as that shown in the Moores, Jr. patent, permit a type of scrolling of the saw blade, but this scrolling is step-wise. In other words, only a discreet number of scroll angles can be attained. The Moores, Jr. patent discloses a saw where the blade holder can be completely removed from the reciprocating shaft and then replaced in one of only four possible scroll angles. The Moores, Jr. patent saw is not as desirable as a saw with continuous scrolling since the step-wise scrolling limits its adjustability. Also complete removal of the blade holder from the reciprocating shaft in order to make a scrolling adjustment is cumbersome and slow.

In this embodiment, the pivot assembly 100 also permits continuous adjustability of the pivot angle within its range of adjustability.

The scroll angle can be adjusted regardless of the pivot angle of the pivot assembly 100. In other words, the pivot angle and the scroll angle can be adjusted independent of one another, or they can be adjusted simultaneously to attain a desired combination of pivot angle and scroll angle.

Both the pivot assembly 100 and the scroll assembly 200 may have rotation locks which selectively prevent rotation. A rotation lock for the pivot assembly 100 prevents rotation of the pivot assembly relative to the motor assembly 20. A rotation lock for the scroll assembly 200 prevents rotation of the scroll assembly relative to the pivot assembly 100 and motor assembly 20. A particular type of rotation lock is depicted in the illustrated embodiment and will be described below. However, those skilled in the art will be able to select other types of rotation locks for use with the pivot assembly 100 or scroll assembly 200 and the invention is not limited to use of any particular rotation lock.

Tradesmen who must work quickly and do not want to carry numerous tools will appreciate that the pivot assembly 100 and the scroll assembly 200 can be adjusted without needing any tools. Toolless adjustability of the pivot assembly 100 or scroll assembly 200 can be permitted by providing a rotation lock which is actuated by hand. In this embodiment, by depressing buttons 150b and 210b on the exterior of each assembly, the rotation locks are released to permit selective rotation of the pivot assembly 100 and the scroll assembly 200, respectively. Because tools are not needed, the adjustments can always be quickly and conveniently made, even when working in awkward positions or cramped quarters.

The illustrated embodiment also advantageously results in a relatively compact saw. When the pivot assembly 100 is rotated to a +90° or a −90° pivot angle as in FIGS. 3A and 3B, the greatest distance from the tip of a fully extended 6 inch saw blade to any portion of the pivot assembly 100 is only about 13 inches. This length is significantly less than the length of traditional reciprocating saws measured from the tip of the saw blade to the handle. This compactness facilitates use of the saw in cramped quarters. Significantly for plumbers and HVAC mechanics, this approximate 13 inch length permits the adjustable reciprocating saw to easily make cuts in floor joints spaced 16 inches on center.

Figure 5:
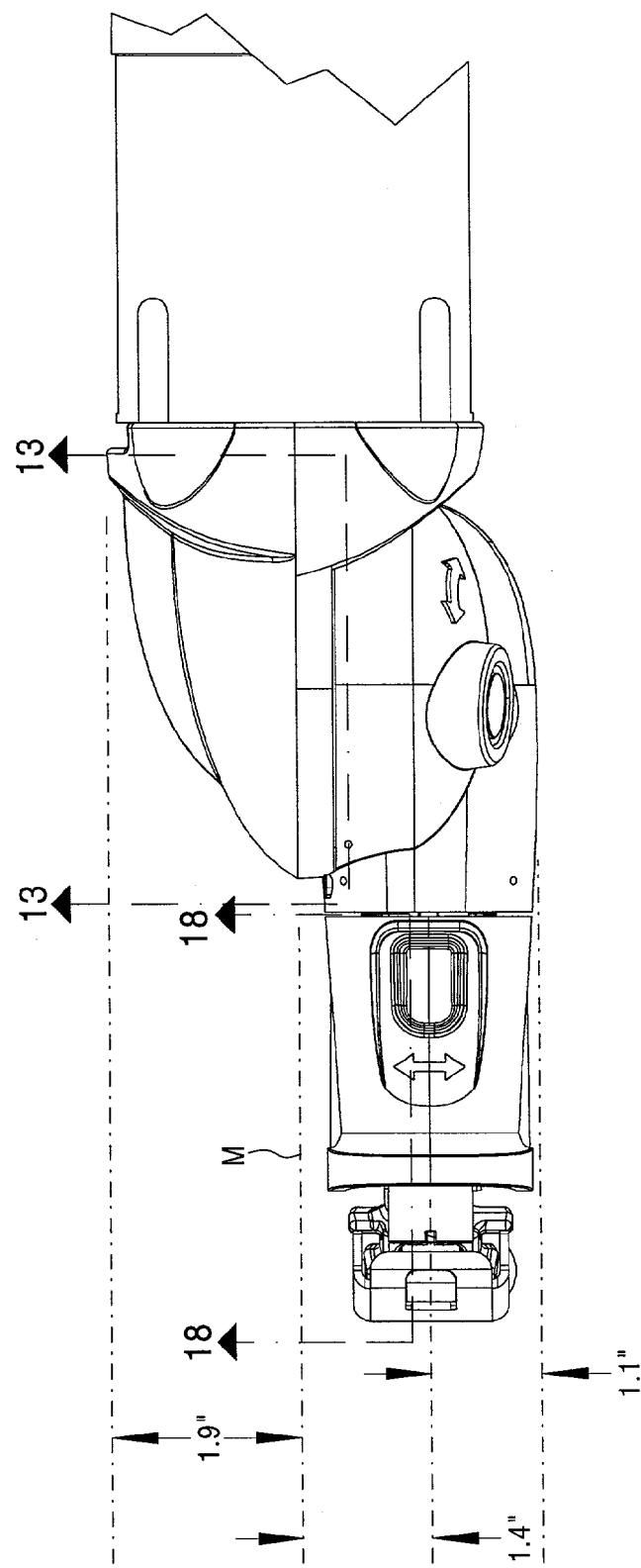
FIG. 5 is a top view of a portion of the saw of FIG. 1 illustrating several cutting planes which define sectional views used in the figures.

As best shown in FIG. 5, the saw blade 30 is also offset from the midplane M of the saw. The midplane is defined as the plane of general symmetry dividing the saw and passing through the middle of the handle portion 10. This offset allows the saw to make a cut more closely to an obstacle positioned parallel to the direction of the cut than would be possible if the saw blade 30 were positioned on the midplane M. The longitudinal axis of the saw blade 30 is spaced from the midplane M approximately 1.4 inches in the illustrated embodiment. This results in the ability to make a cut parallel to an obstacle approximately 1.1 inches from the obstacle. For example, if it is desired to cut a pipe as close as possible and parallel to a slab of concrete from which the pipe extends perpendicularly, the pipe could be cut 1.1 inches from the concrete. Otherwise, if the saw blade 30 were positioned in the midplane M of the saw, the pipe could only be cut 1.9 inches from the concrete.

Figure 6:
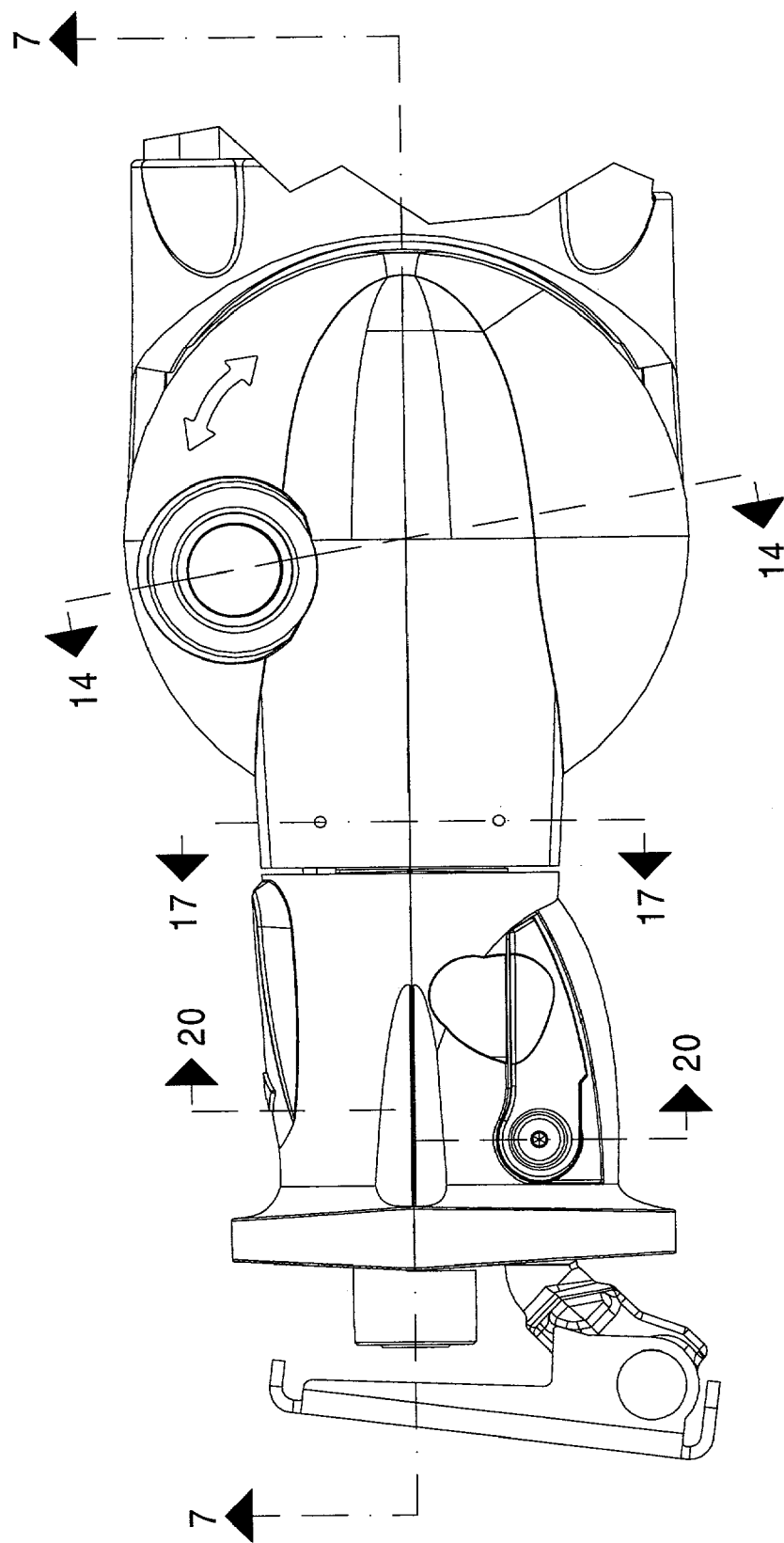
FIG. 6 is a front view of a portion of the saw of FIG. 1 illustrating several cutting planes which define sectional views used in the figures.
Figure 7:
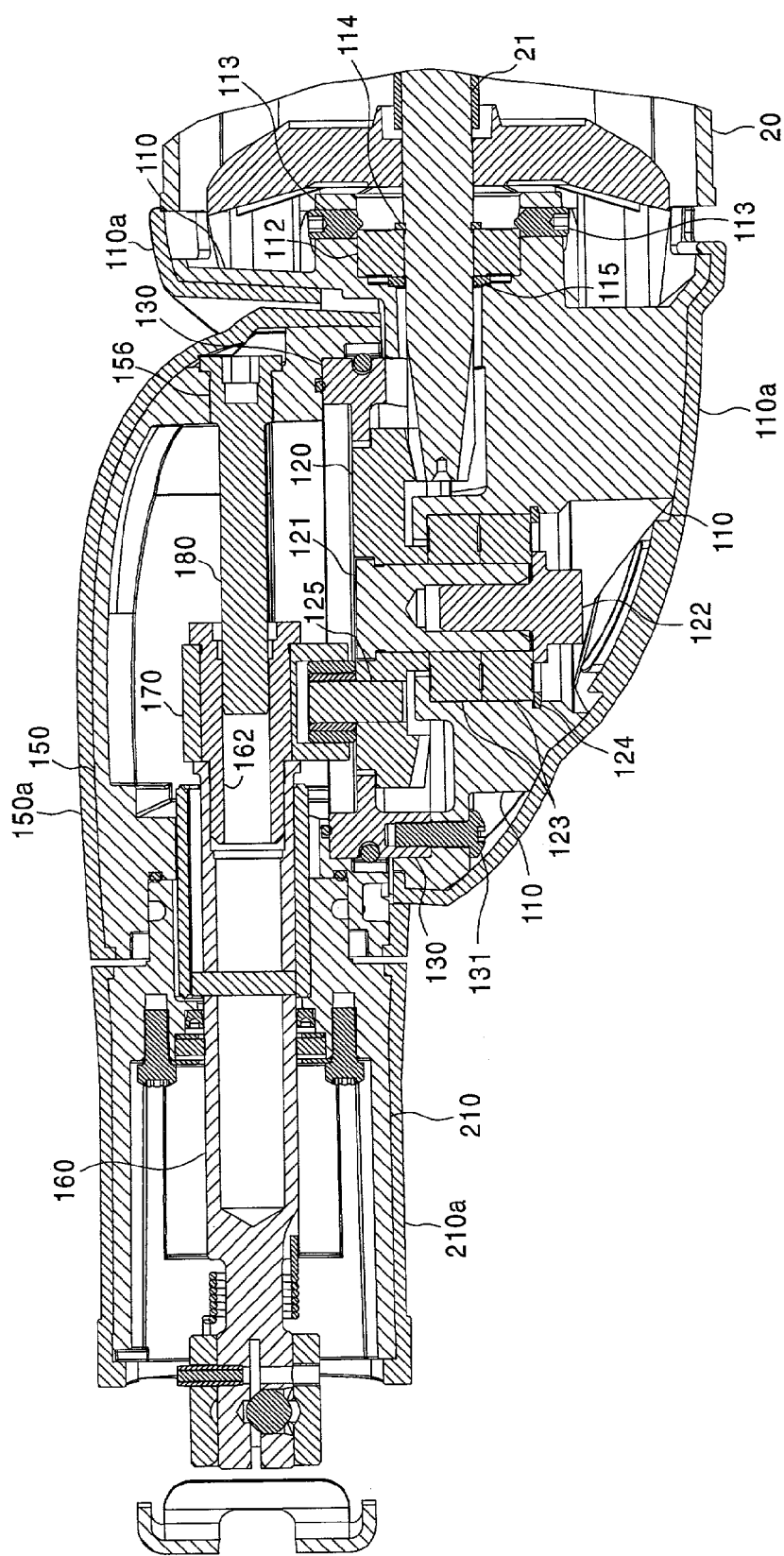
FIG. 7 is a sectional view of the saw of FIG. 1 taken from plane 7—7 in FIG. 6.
Figure 8:
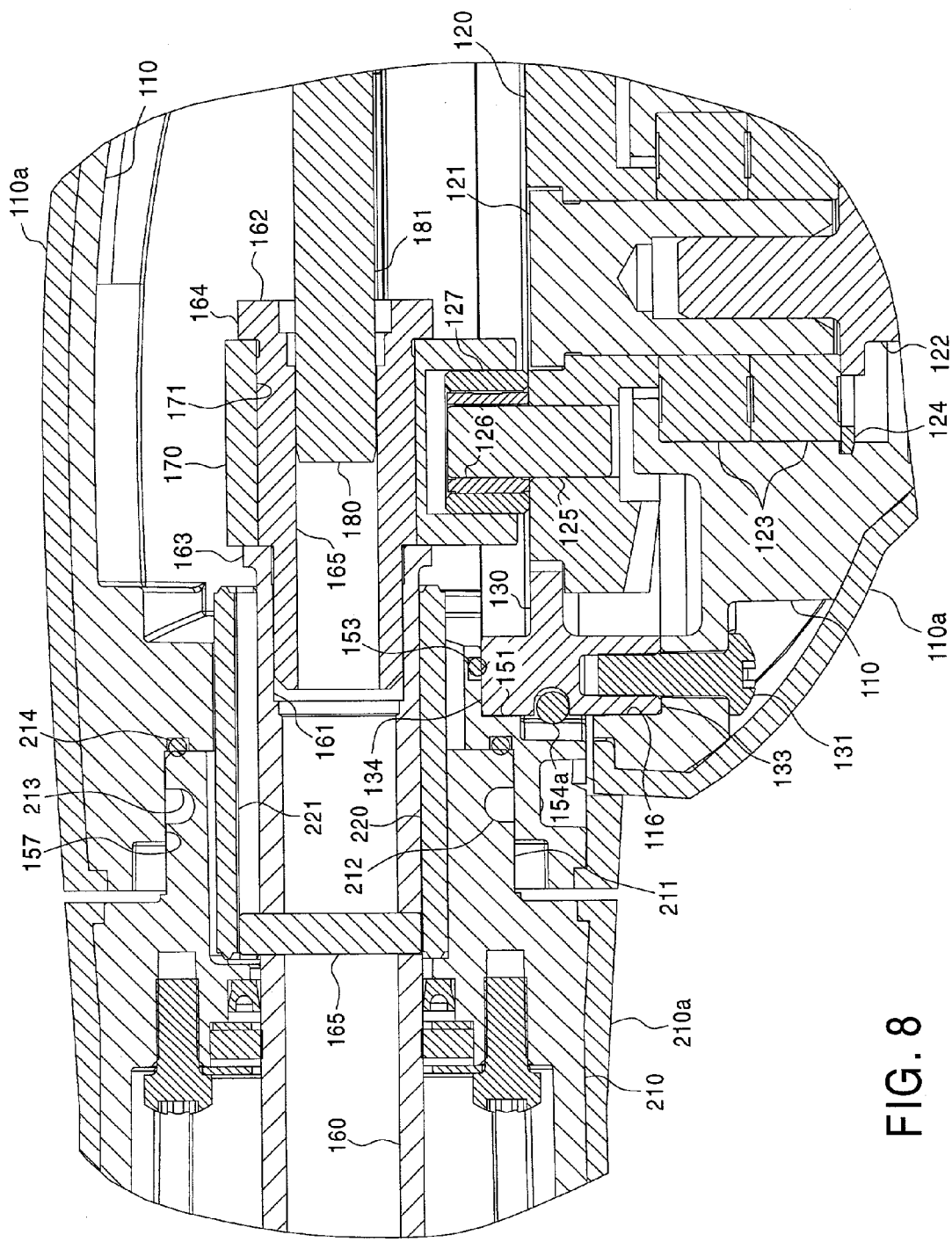
FIG. 8 is a detail view of the sectional view of FIG. 7.
Figure 9:
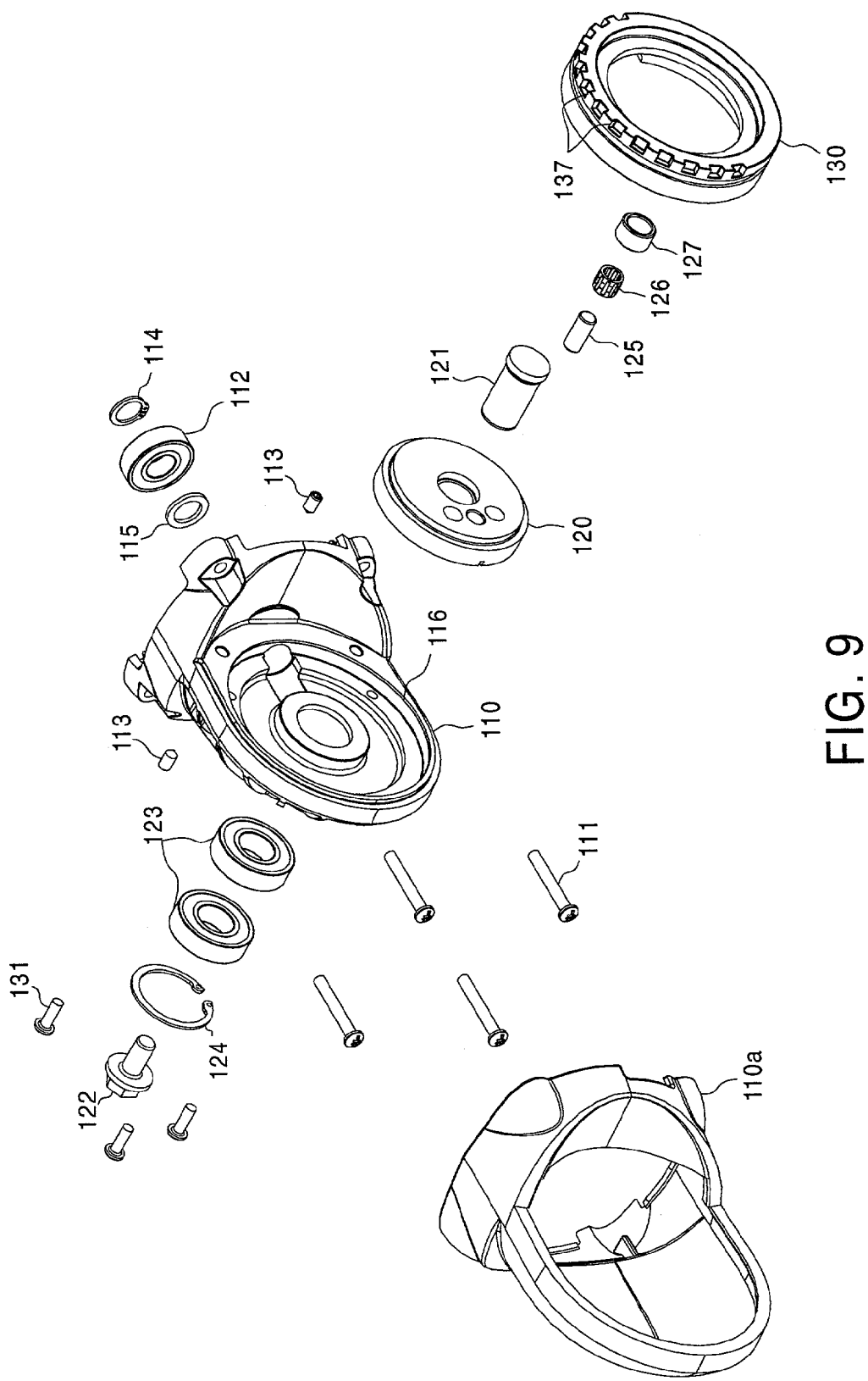
FIG. 9 is an exploded view of a portion of the saw of FIG. 1.

With reference to FIGS. 7–15, the pivot assembly 100 of the adjustable reciprocating saw will be described in detail. FIG. 7 is a sectional view of the saw taken along plane 7—7 shown in FIG. 6. A detail view of the sectional view in FIG. 7 is shown in FIG. 8. An exploded view of a portion of pivot assembly 100 is shown in FIG. 9. A gear housing 110 is mounted to the motor housing 20 with fasteners 111. The term mounted shall be broadly construed herein to mean both permanent and detachable attachment of one part to another, as well as the attachment of two parts which are jointly formed as a unitary component. The term mounted shall also include the attachment of one part to another where some degree of relative movement between the two parts is still permitted. The term mounted shall also include both the direct mounting of one part to another, or the indirect mounting of two parts via other parts. In a preferred embodiment, gear housing 110 is made from die-cast aluminum. Of course, gear housing 110 may be made of any appropriate material and process, as will be recognized by those skilled in the art. A motor shaft 21 (FIG. 7) passes from the motor assembly 20 into the gear housing 110. The motor shaft 21 is supported for rotation in the gear housing 110 by a bearing 112. Bearing 112 is received in a bore formed in gear housing 110 and is held in place in the bore with set screws 113. A retaining ring 114 is mounted in a groove formed on the motor shaft 21 and prevents the motor shaft 21 from moving too far forward into gear housing 110. A seal 115 seals the joint between the gear housing 110 and the motor shaft 21 to protect the internal moving parts in gear housing 110. The motor shaft 21 has gear teeth formed on the end thereof which mesh with gear teeth formed on a bevel gear 120.

Bevel gear 120 is supported for rotation by gear housing 110 on gear shaft 121. Bolt 122 mounts in an internal threaded bore formed in one end of the gear shaft 121. Bolt 122 and gear shaft 121 together trap between them bevel gear 120 and two bearings 123. The bearings 123 are held by a retaining ring 124 in a bore formed in the gear housing 110. Thus, bevel gear 120 is free to rotate relative to gear housing 110 and is driven by the motor shaft 21.

Drive pin 125 is mounted in a bore in bevel gear 120 formed eccentric to and parallel to the rotational axis of bevel gear 120. The drive pin 125 protrudes from the top surface of bevel gear 120 and a roller cage 126 is mounted around the protruding portion of the drive pin. A roller 127 is in turn mounted around the roller cage 126. Additional bores may be formed in appropriate locations on the bevel gear 120 for dynamic balancing.

With eccentrically mounted drive pin 125, the bevel gear forms part of a Scotch yoke mechanism, well known in reciprocating saws as a mechanism for transforming rotational motion into reciprocal motion. As will be recognized by those skilled in the art, the Scotch yoke mechanism in this embodiment could be replaced by any reciprocating mechanism known for producing reciprocating motion. The invention is not limited solely to saws which use a Scotch yoke as the reciprocating mechanism.

Figure 10A:
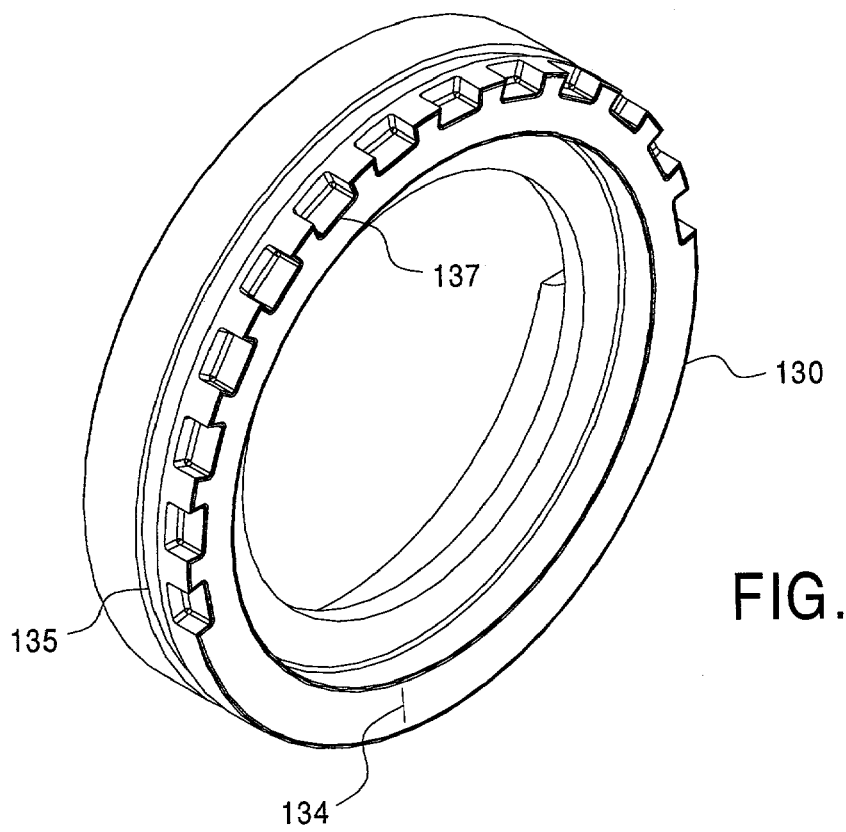
FIGS. 10A and 10B are isometric views of the ring 130 of FIG. 9.
Figure 10B:
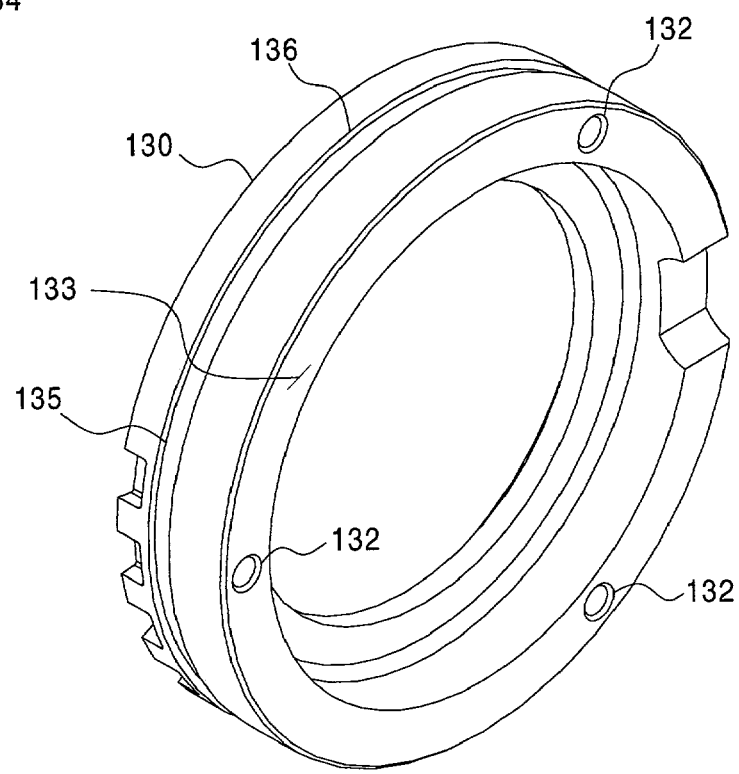

A ring 130 is also mounted to the gear housing 110 and is illustrated in detail in FIGS. 10A and 10B. The purpose of ring 130 will be described in greater detail below. Three threaded bores 132 formed in ring 130 accept three screws 131 which in turn pass through three bores formed in the gear housing 110 to clamp the ring 130 to gear housing 110. Ring 130 has a first axial face 133 which fits in a bore 116 formed in the gear housing 110 and centered on the rotational axis of the bevel gear 120.

When ring 130 and bevel gear 120 have been mounted to the gear housing 110, and gear housing 110 has been mounted to the motor housing 20, then a gear housing boot 110a (FIG. 9) is fit over gear housing 110. In a preferred embodiment, gear housing boot 110a is molded from a thermoplastic elastomer ("TPE"). However, gear housing boot 110a can be formed from any desirable material and process. The purpose of gear housing boot 110a is to cover some of the various fasteners and components which attach to the gear housing 110 to provide a smooth, continuous surface on the exterior of gear housing 110. This smooth, continuous surface is desirable because the exterior of gear housing 110 will be grasped by the user's hands. Also, if gear housing boot 110a is formed of a relatively soft material, such as TPE, then it can function as an effective gripping surface to facilitate wielding the tool, and a damping material to protect the user's hands from the saw's vibrations. In addition, TPE functions as an insulator against heat and electric current.

Figure 11:
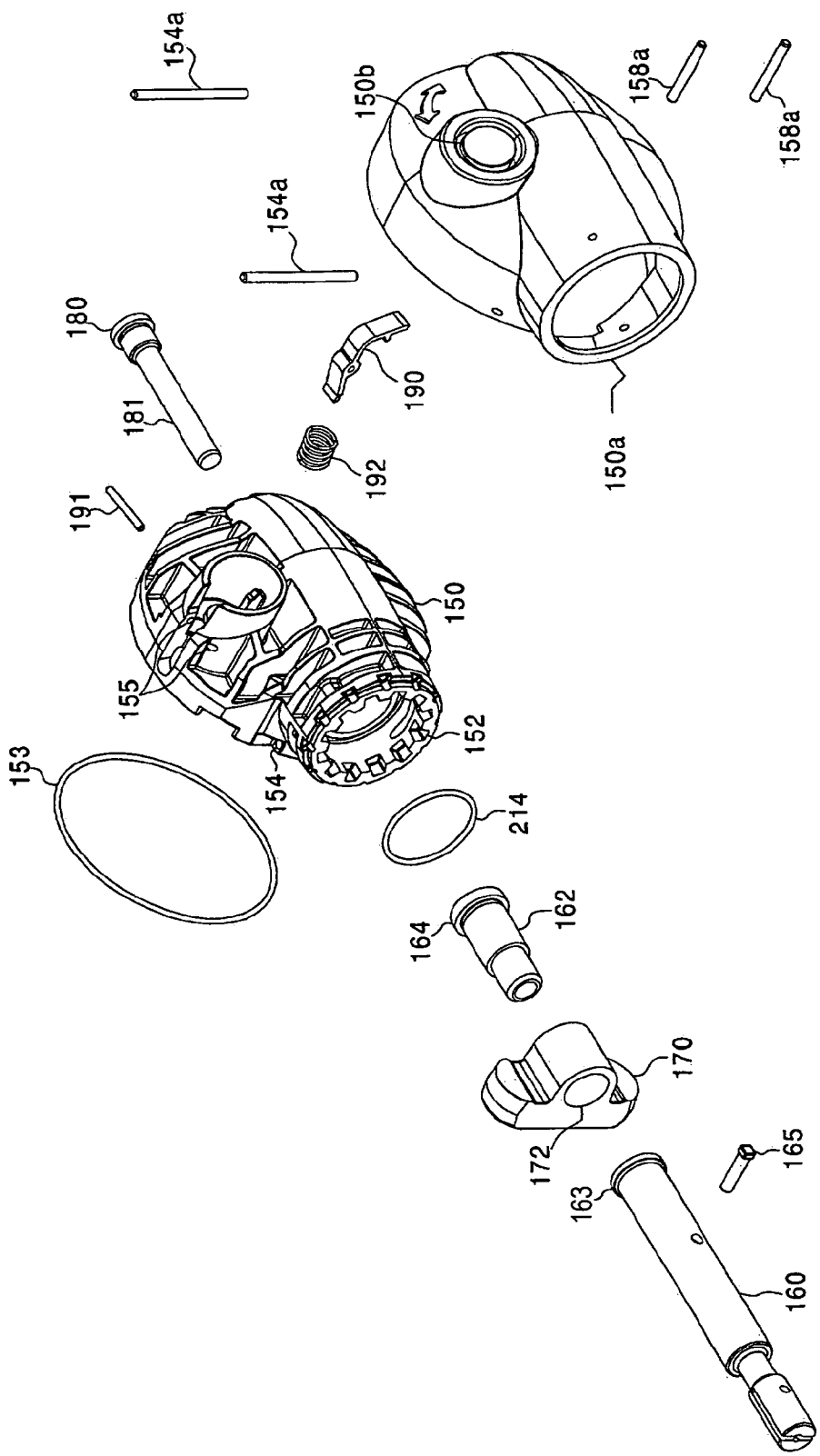
FIG. 11 is an exploded view of a portion of the saw of FIG. 1.

FIG. 11 is an exploded view of a pivot housing 150 which, when assembled, is rotationally mounted to the gear housing 110. In a preferred embodiment, pivot housing 150 is made from die-cast aluminum, but could be made from any appropriate material and process as will be recognized by those of skill in the art. The rotational axis of the pivot housing 150 relative to the gear housing 110 is approximately coaxial with the rotational axis of the bevel gear 120 relative to the gear housing 110. Because these axes are approximately coaxial, the pivot assembly 150 can be rotated relative to the gear housing 110 while maintaining the functionality of the Scotch yoke reciprocating mechanism. Indeed, the pivot assembly 150 can even be rotated relative to the gear housing 110 while the saw is operating.

Figure 12:
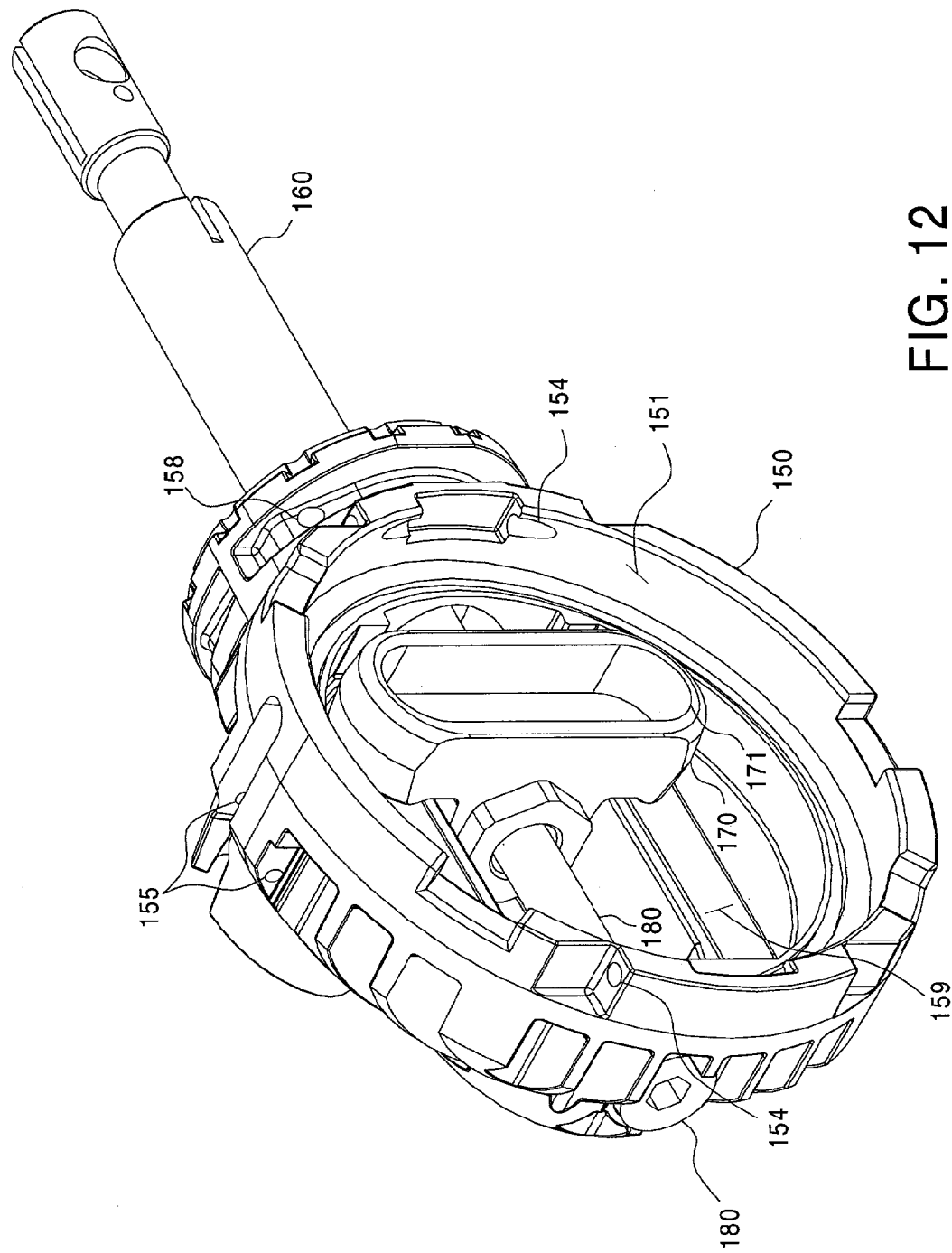
FIG. 12 is an assembly view of some of the parts shown in FIG. 11.
Figure 13:
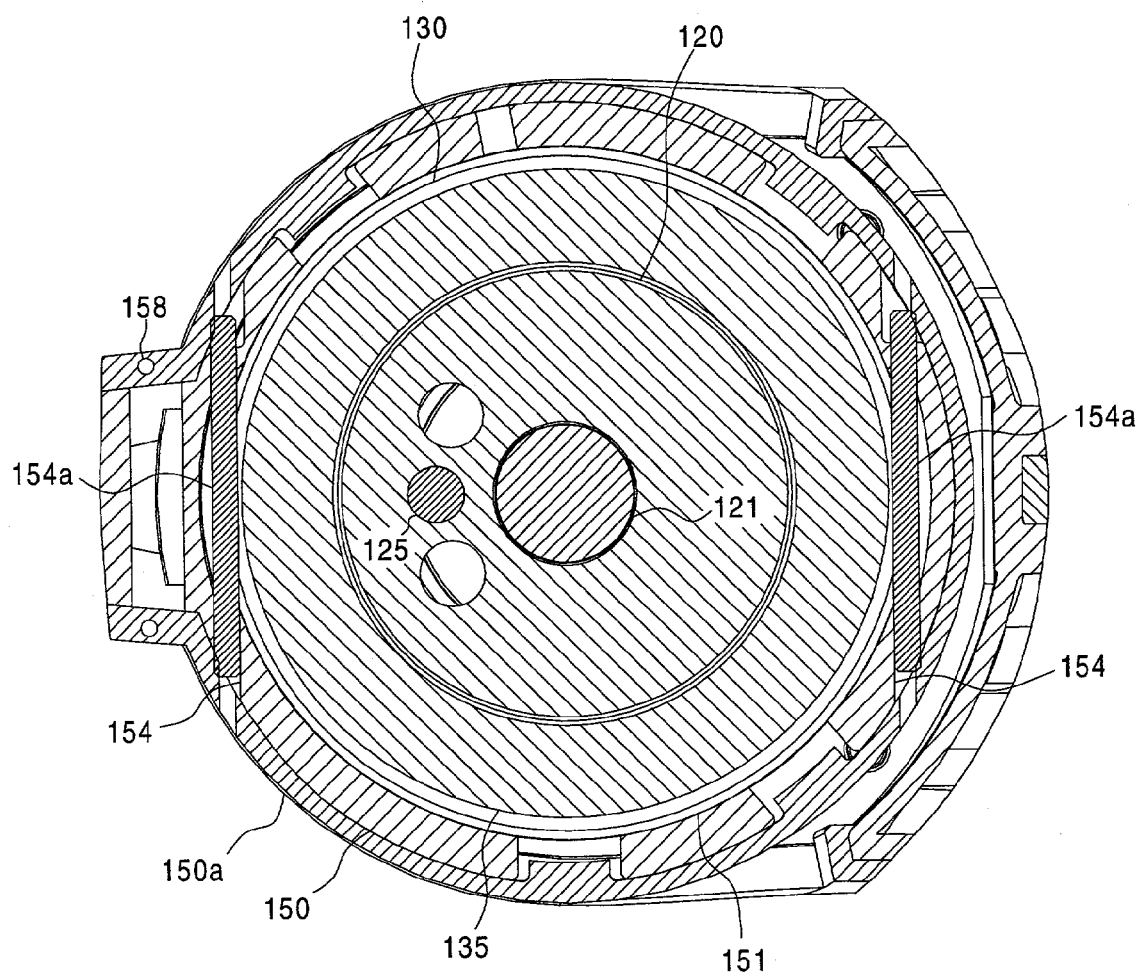
FIG. 13 is a sectional view taken from plane 13—13 in FIG. 5.

Pivot housing 150 has a bore 151 formed on an interior surface which mates with a second axial face 134 of ring 130. When bore 151 and ring 130 are mated, one or more detachable locking pieces are mounted to the pivot housing 150 to form a rotating joint. In this embodiment, there are two locking pieces comprising a pair of pins 154a. As seen in FIGS. 12 and 13, the pins 154a are mounted with either an interference or clearance fit in holes 154 formed in the pivot housing 150. If a clearance fit is used, the pins 154a can be fitted with locking O-rings so that when the pins are inserted into holes 154, the locking O-rings will assist in holding the pins in position. Both the interference fit and the clearance fit with locking O-rings advantageously do not require the use of separate detachable fasteners to mount the pins 154a saving both the expense of additional parts and increased assembly time. When mounted, the pins 154a are positioned in the pivot housing 150 tangential to radial groove 135 formed on the ring 130. The radial groove 135 is centered on and extends at least part way around the rotational axis of pivot housing 150. Radial groove 135 has a flange 136 which contacts the pins 154a when the pivot housing 150 is moved axially away from the gear housing 110, blocking such movement. When pivot housing 150 rotates relative to gear housing 110, the pins 154a move angularly in and remain tangent to the radial groove 135.

In order for the rotating joint to feel "tight" to the user (meaning an absence of an appreciable amount of play in the joint, slight movement due to manufacturing tolerances, etc., being unavoidable), the gear housing 110 and pivot housing 150 are biased away from one another by a biasing member so that the flange 136 is constantly biased against the pins 154a. In the illustrated embodiment, the biasing member is an O-ring 153 positioned between the gear housing 110 and pivot housing 150. When the gear housing 110 and pivot housing 150 are assembled, the O-ring 153 is compressed and as a result pushes against the gear housing 110 and pivot housing 150.

Of course, other types of locking pieces may be used in the rotating joint. Indeed, other methods of forming a rotating joint may be used. For example, the locking pieces may be detachably mounted to the gear housing 110 instead of to the pivot housing 150, so long as a flange or other structure to engage the locking pieces is also provided on pivot housing 150 instead of the gear housing 110. The invention is not intended to be limited to any particular type of rotating joint except as specifically recited in the appended claims. As another example, a clamping mechanism could be used to clamp the gear housing 110 to the pivot housing 150.

Figure 14:
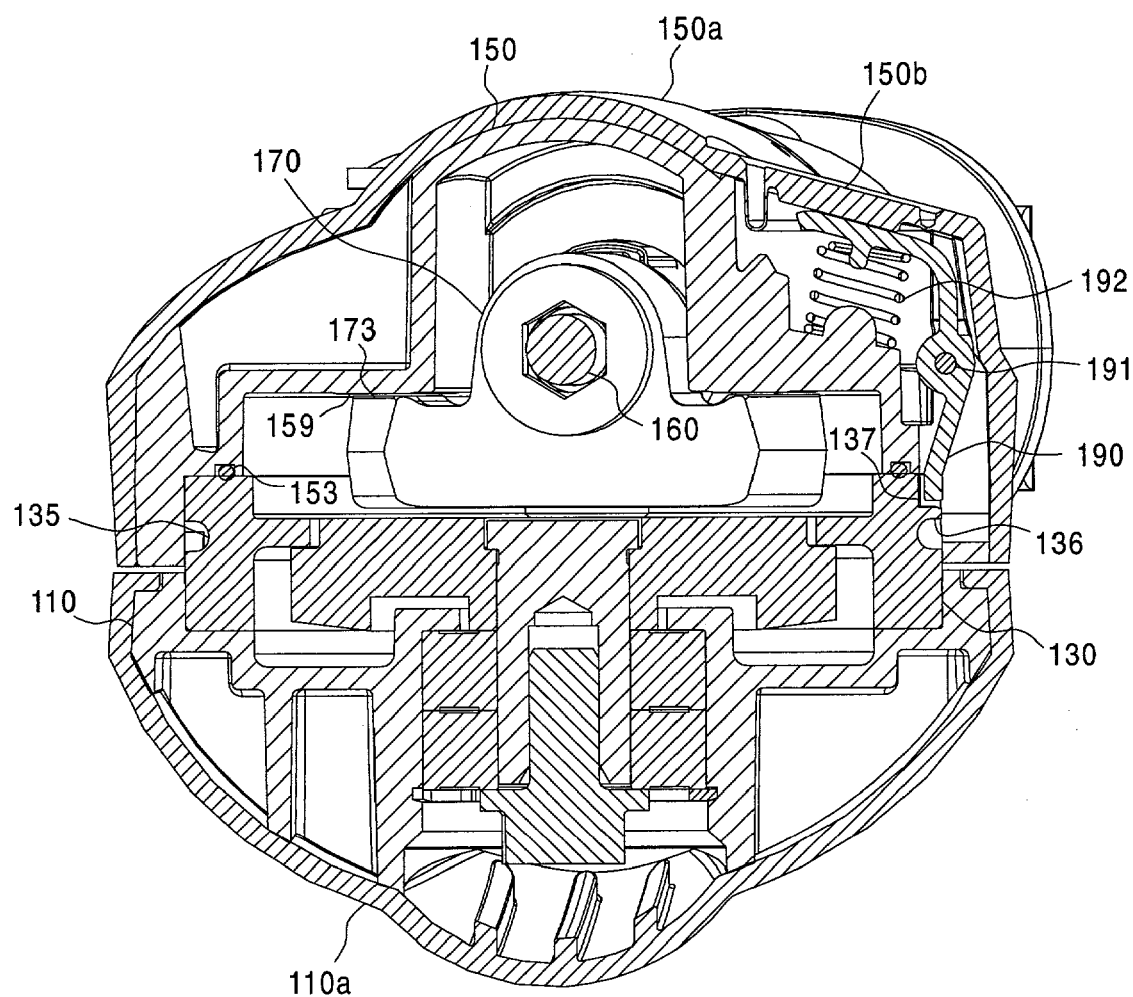
FIG. 14 is a sectional view taken from plane 14—14 in FIG. 6.

A rotation lock can be provided to selectively prevent the pivot housing 150 from rotating relative to the gear housing 110. In this embodiment, a locking mechanism and detents are used to lock the pivot housing 150. As shown in FIG. 10A, detents 137 are formed on the ring 130 equally angularly spaced from one another in a radial pattern centered on the rotational axis of pivot housing 150. As shown in FIG. 14, a locking mechanism 190 is pivotally mounted to the pivot housing 150 with a pin 191. Pin 191 engages a hole 155 formed in the pivot housing 150 and a hole in the locking mechanism 190. The locking mechanism 190 has two positions: a first position wherein a portion of the locking mechanism 190 engages one of the detents 137, and a second position wherein the same portion of the locking mechanism 190 can bypass the detents 137 when the pivot housing 150 is rotated relative to the gear housing 110. The locking mechanism 190 pivots about pin 191 between the first and second positions. A spring 192 is positioned between the locking mechanism 190 and the pivot housing 150 to bias the locking mechanism 190 to its first position.

The locking mechanism 190 can be actuated by the user through depression of a button 150b formed in the pivot housing boot 150a. The button 150b is an integral portion of a pivot housing boot 150a and is made to be flexible relative to the rest of the boot. When the button 150b is depressed, it bears against the locking mechanism 190 causing it to pivot about pin 191 to its second position. Thus, the angular position of the pivot housing 150 can be adjusted relative to the gearing housing 110 without the use of any tools through simple depression of button 150b to unlock the locking mechanism 190.

Of course, modifications may be made to the rotation lock of this embodiment or other types of rotation locks may be used. As an example, the locking mechanism could be mounted to the gear housing 110 instead of to the pivot housing 150, so long as the detents are also formed in the pivot housing 150 instead of the gear housing 110. As another example, the detents could be wedge-shaped and a portion of the locking mechanism could have a corresponding wedge shape so that the engagement between the detents and the constantly biased locking mechanism feels even tighter. The invention is not intended to be limited to any particular rotation lock except to the extent specifically recited in the appended claims.

Figure 15A:
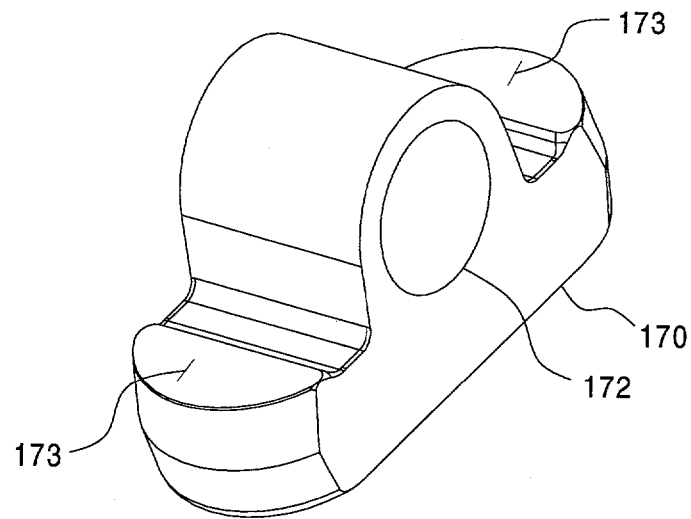
FIGS. 15A and 15B are isometric views of the yoke 170 of FIG. 11.
Figure 15B:
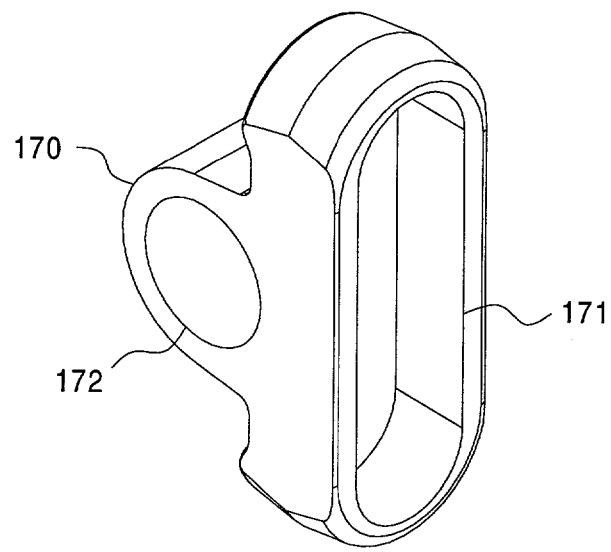
Figure 16:
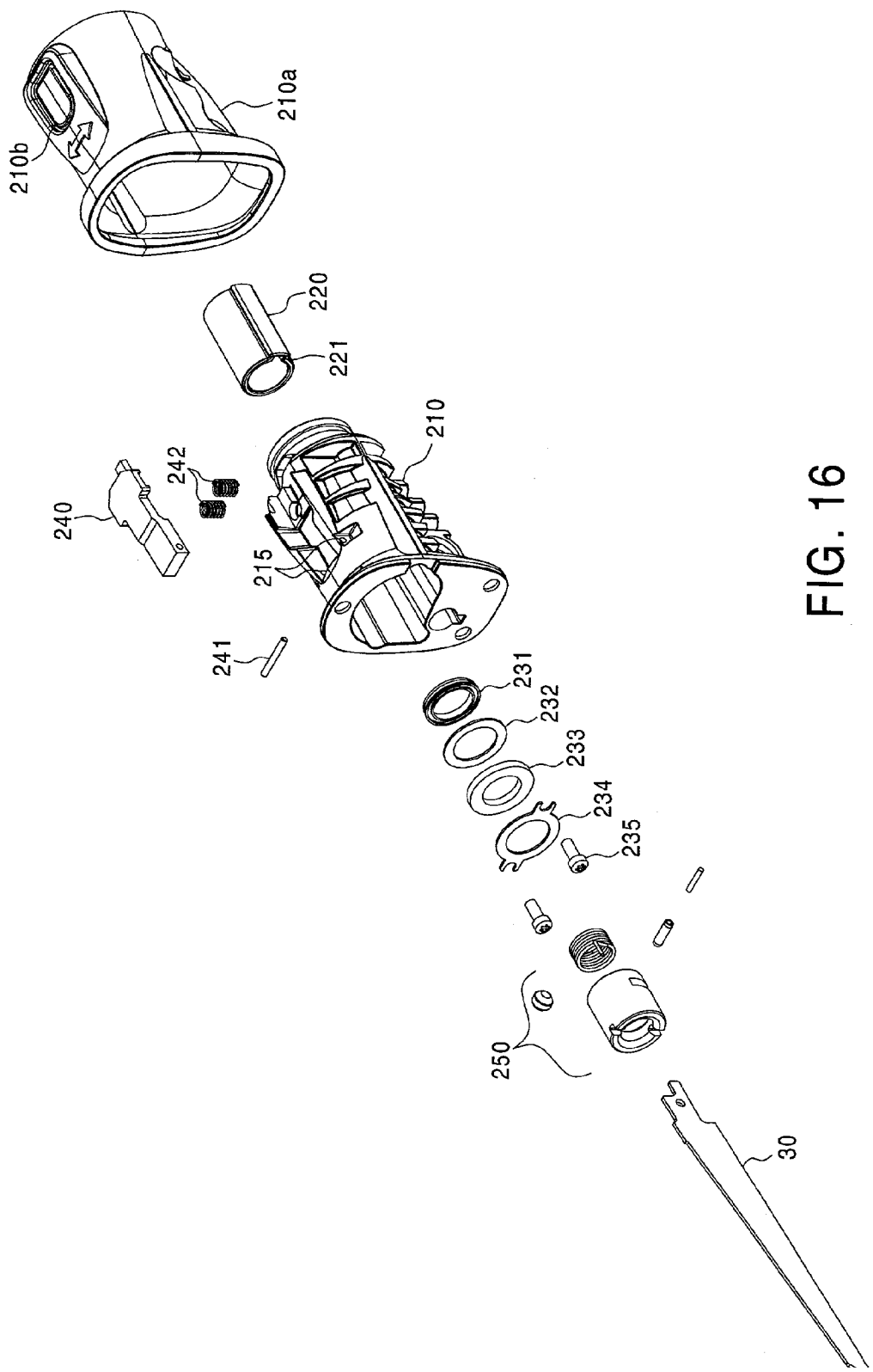
FIG. 16 is an exploded view of a portion of the saw of FIG. 1.

The pivot housing 150 has mounted thereto a reciprocating shaft 160 and a yoke 170. The yoke 170 and eccentrically mounted drive pin 125 together convert rotary motion into reciprocal translatory motion. As seen in FIGS. 12 and 15B, the yoke 170 has a slot 171 formed therein. The roller bearing 127 of drive pin 125 fits within the slot 171.

The movement of yoke 170 is constrained by the reciprocating shaft 160 and pivot housing 150. The reciprocating shaft 160 fits inside of a bore 172 formed in the yoke 170 and constrains its movement thereby. As seen in FIG. 14, the yoke 170 also has bearing surfaces 173 which ride against bearing surfaces 159 formed on the pivot housing 150.

The reciprocating shaft 160 is free to rotate relative to the yoke 170. In this embodiment, rotation of the reciprocating shaft 160 relative to the reciprocating mechanism facilitates scrolling of the saw blade 30. In other embodiments, rotation of the reciprocating shaft 160 relative to the reciprocating mechanism may not be necessary. With reference to FIG. 8, reciprocating shaft 160 has a threaded axial bore 161 formed in one end thereof which mounts a guide sleeve 162 with cooperating threads. As part of the reciprocating shaft 160, guide sleeve 162 fits inside of bore 172 of yoke 170 in a clearance fit. On the same end as bore 161, the reciprocating shaft 160 has a flange 163 and the guide sleeve 162 has a flange 164. Together, flanges 163 and 164 trap the yoke 170 on reciprocating shaft 160 while permitting reciprocating shaft 160 to rotate relative to the yoke 170. Yoke 170 alternately pushes against flanges 163 and 164 to drive the reciprocating shaft 160 in its reciprocating motion. With this construction, yoke 170 can be advantageously constructed as one unitary component for increased strength and dimensional repeatability over prior designs which proposed a two-piece yoke.

Alternative embodiments of this connection between the yoke 170 and the reciprocating shaft 160 are possible. For example, instead of providing flanges 163 and 164 on the reciprocating shaft 160, two flanges could be provided on the yoke which would trap a portion of the reciprocating shaft between them.

The reciprocating shaft 160 is supported in the pivot housing 150 by a rear internal bearing which is more compact than rear bearings in prior art designs. In this embodiment, the bearing comprises a guide pin 180. With reference again to FIG. 8, one end of guide pin 180 forms an exterior bearing surface 181. The guide sleeve 162 forms another interior bearing surface 165 on the reciprocating shaft 160. Guide pin 180 has threads on its opposite end which engage complementary threads formed in a bore 156 (FIG. 7) to mount the guide pin to the pivot housing 150.

Having this rear bearing in addition to a front bearing is preferential to a design with only a front bearing. A single front bearing supporting the reciprocating shaft would have to counter all of the bending moments created in such a cantilevered reciprocating shaft. With the addition of a rear bearing, the bending moments can be better controlled by two spaced apart bearings, increasing the life of each bearing and making the saw more durable. This design for a compact, rear internal bearing is not limited to use with adjustable reciprocating saws. As will be recognized by those skilled in the art, this design can be used with many other reciprocating saws, as well.

When reciprocating shaft 160, yoke 170, guide pin 180 and locking mechanism 190 are assembled with pivot housing 150, a pivot housing boot 150a is mounted to the pivot housing 150. The pivot housing boot 150a is molded from TPE in a preferred embodiment, but can be formed from any suitable material and process. Its function and advantages are similar to the gear housing boot 110a to whose description reference may be made for further details.

With reference to FIGS. 7–8 and 16–18, the scroll assembly 200 will be described in detail. A scroll housing 210 is supported on the pivot housing 150 for rotational movement relative thereto. The scroll housing 210 rotates about a rotational axis generally parallel to the reciprocating motion axis of the reciprocating shaft 160. In this embodiment, the scroll housing 210 is rotationally mounted to the pivot housing 150. However, in another embodiment without a pivot angle adjustment, the scroll housing 210 could be mounted directly to the motor assembly 20. With either embodiment, the principle of scrolling is the same—the scroll housing rotates relative to a stationary housing (either the motor assembly 20 or the pivot assembly 150, or even another portion of the saw) to adjust the saw blade about a rotational axis generally parallel to the reciprocating motion axis. In the illustrated embodiment, the scroll housing 210 can even be rotated while the saw is operating.

Figure 17:
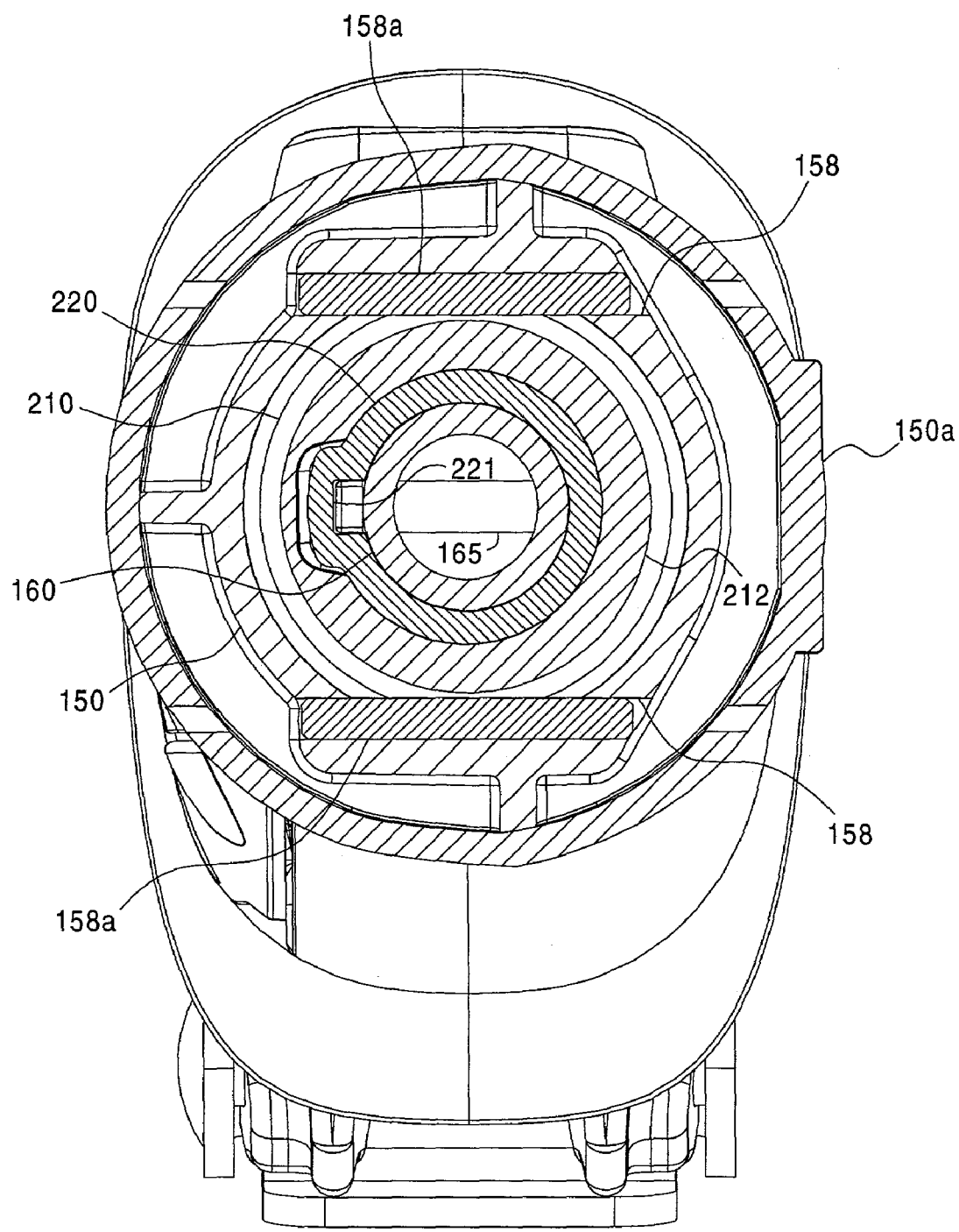
FIG. 17 is a sectional view taken from plane 17—17 in FIG. 6.

With reference to FIG. 8, the pivot housing 150 has a bore 157 formed parallel to the reciprocating motion axis of the reciprocating shaft 160. The scroll housing 210 has a shoulder 211 which makes a sliding fit into bore 157. The shoulder 211 has a radial groove 212 formed thereon and centered on the rotational axis of the scroll housing 210. As shown in FIG. 17, two pins 158a are mounted in the pivot housing 150 in holes 158. When mounted, the pins 158a are positioned tangential to the radial groove 212. Radial groove 212 has a flange 213. Flange 213 engages the pins 158a to block axial movement of the scroll housing 210 away from the pivot housing 150. O-ring 214 creates a tight feel in the joint by constantly biasing flange 213 against pins 158a. This rotating joint being similar to the rotating joint between the pivot housing 150 and the gear housing 110, reference to the description of that similar joint may be made for further pertinent details. Of course, as with the other rotating joint, other locking pieces and other methods for providing a rotating joint may be used. In this embodiment, the design of each of the two rotating joints is the same. However, a different design for each rotating joint could be used. The invention is not intended to be limited to any particular rotating joint except to the extent specifically recited in the appended claims.

Figure 18:
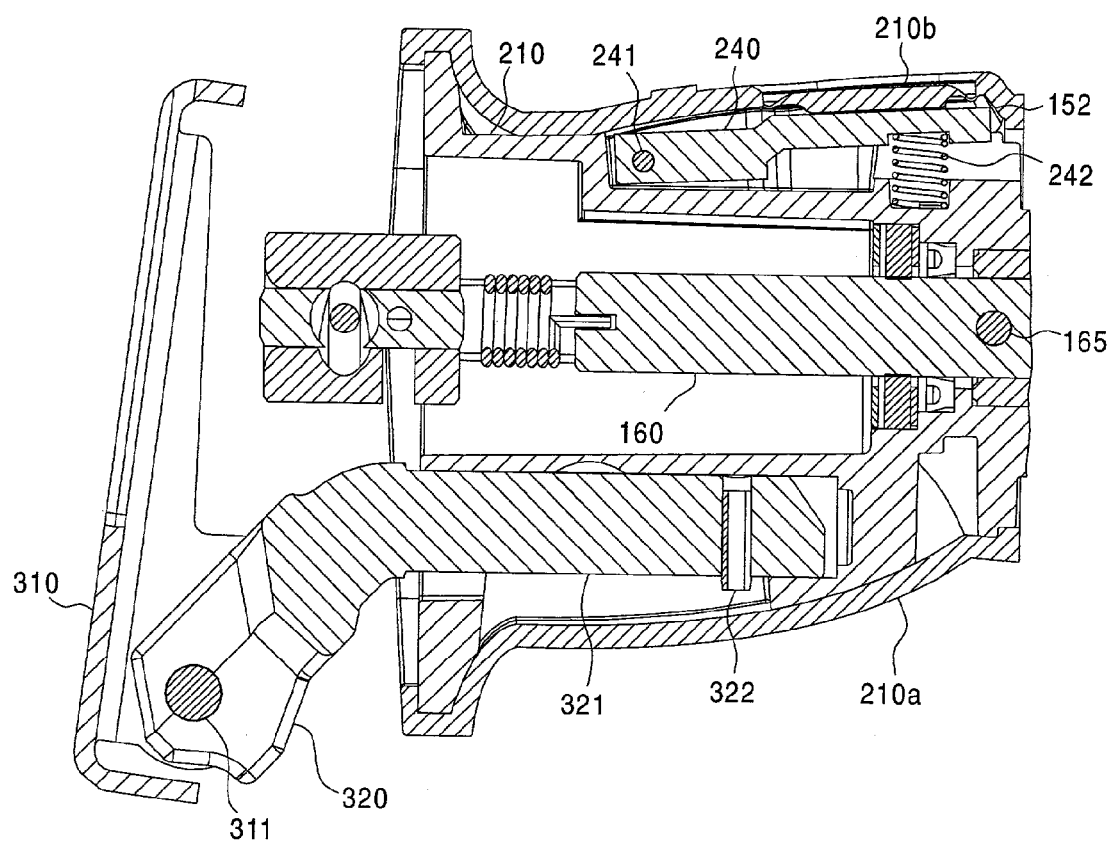
FIG. 18 is a sectional view taken from plane 18—18 in FIG. 5.
Figure 19:
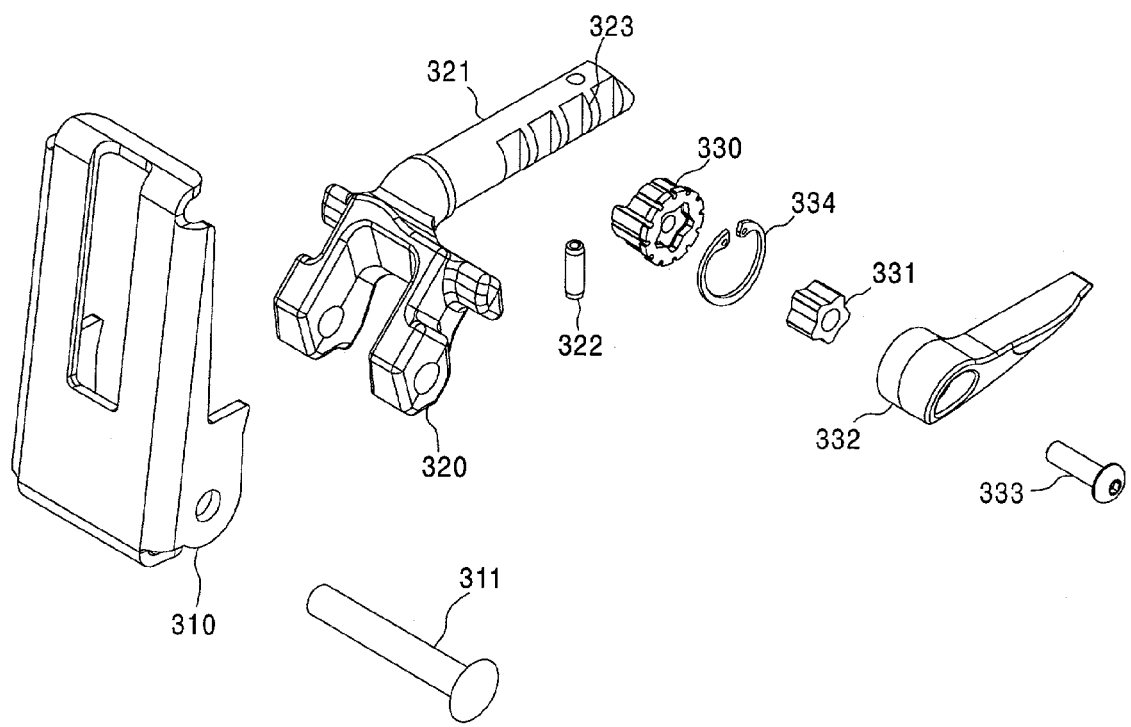
FIG. 19 is an exploded view of a portion of the saw of FIG. 1.

A rotation lock can be used to selectively prevent rotation of the scroll housing 210 relative to the pivot housing 150. Equally angularly spaced detents 152 (FIG. 11) are formed radially on the pivot housing 150 centered about the rotational axis of scroll housing 210. Locking mechanism 240 is pivotally mounted to the scroll housing 210 and has two positions: a first position where a portion of the locking mechanism 240 engages the detents 152, and a second position where the same portion of the locking mechanism 240 bypasses the detents 152 to allow the scroll housing 210 to rotate relative to the pivot housing 150. As seen in FIG. 18, the locking mechanism 240 is mounted to the scroll housing 210 via a pin 241 which is mounted in a bore 215 formed in the scroll housing 210. The locking mechanism 240 pivots between its first and second positions. Springs 242 are interposed between the scroll housing 210 and the locking mechanism 240 to bias the locking mechanism 240 to its first position. By depressing a button 210b of a scroll housing boot 210a, the user can actuate the locking mechanism 240. Depression of the button 210b causes the button to push against the locking mechanism 240 and pivot the locking mechanism 240 to its second position. Because this rotation lock is similar to the previously described rotation lock between the pivot housing 150 and the gear housing 110, reference may be had to its earlier description for additional pertinent details. Of course, other types of rotation locks may be used. In this embodiment, each of the two rotation locks is of generally the same design. However, a different design for each of the rotation locks can be used.

The invention is not intended to be limited to any particular rotation lock except where specifically recited in the appended claims.

In this embodiment, rotation of the scroll housing 210 also causes rotation of the reciprocating shaft 160, a blade holder 250, and the saw blade 30. The scroll housing 210 rotates the reciprocating shaft 160 via a bearing 220. Bearing 220 is the front bearing of the reciprocating saw and supports the reciprocating shaft 160 in its reciprocating motion. Together with the rear bearing formed by guide pin 180, the bearing 220 constrains the movement of reciprocating shaft 160 to reciprocal translatory motion in a single direction. Bearing 220 is a cylindrical bearing with an axial channel 221 formed on the interior wall of the bearing and extending axially from end to end. As seen in FIG. 17, the shape of a cavity formed in the scroll housing 210 traces the outer profile of the bearing 220 with the axial channel 221. Bearing 220 engages the cavity with an interference fit to keep it tightly locked in scroll housing 210. Thus, when the scroll housing 210 is rotated, the bearing 220 will also rotate.

The reciprocating shaft 160 has a pin 165 mounted thereto. As seen in FIGS. 17 and 18, the pin 165 protrudes slightly from one side of the round profile of the reciprocating shaft 160 to engage the axial channel 221 formed in the bearing 220. Thus, when bearing 220 rotates, the reciprocating shaft 160 rotates in unison therewith through the engagement of the protruding pin 165 with the axial channel 221.

Because the portion of the reciprocating shaft 160 which passes out of the scroll housing 210 remains circularly cross-sectioned, standard round seals can advantageously be used around the reciprocating shaft 160 to effectively prevent contaminants from entering the pivot housing 150. The seals include a rubber seal 231, a washer 232, and a felt seal 233. A plate 234 attaches to the scroll housing 210 with screws 235, surrounding the reciprocating shaft 160 and holding the seals in position. Round seal components are readily available in standard sizes and seal out contaminants more effectively than polygonal-shaped seals. Thus, compared to some prior art designs which have proposed polygonal-shaped reciprocating shafts, a round reciprocating shaft reduces the cost and increases the durability of the saw.

A blade holder 250 is mounted to the end of the reciprocating shaft 160. The blade holder 250 can be any of a number of blade holders used for releasably holding saw blades on reciprocating shafts. The illustrated embodiment advantageously uses a keyless blade holder disclosed in U.S. Pat. No. 5,575,071 to Alan Phillips.

Although the illustrated embodiment is a saw which has both pivoting and scrolling adjustability, one or the other of these two features could be used separately on a given saw.

Also, the mechanisms and methods for forming the rotation joints and the mechanisms and methods for forming the rotation locks may be used on other tools besides reciprocating saws.

Figure 20:
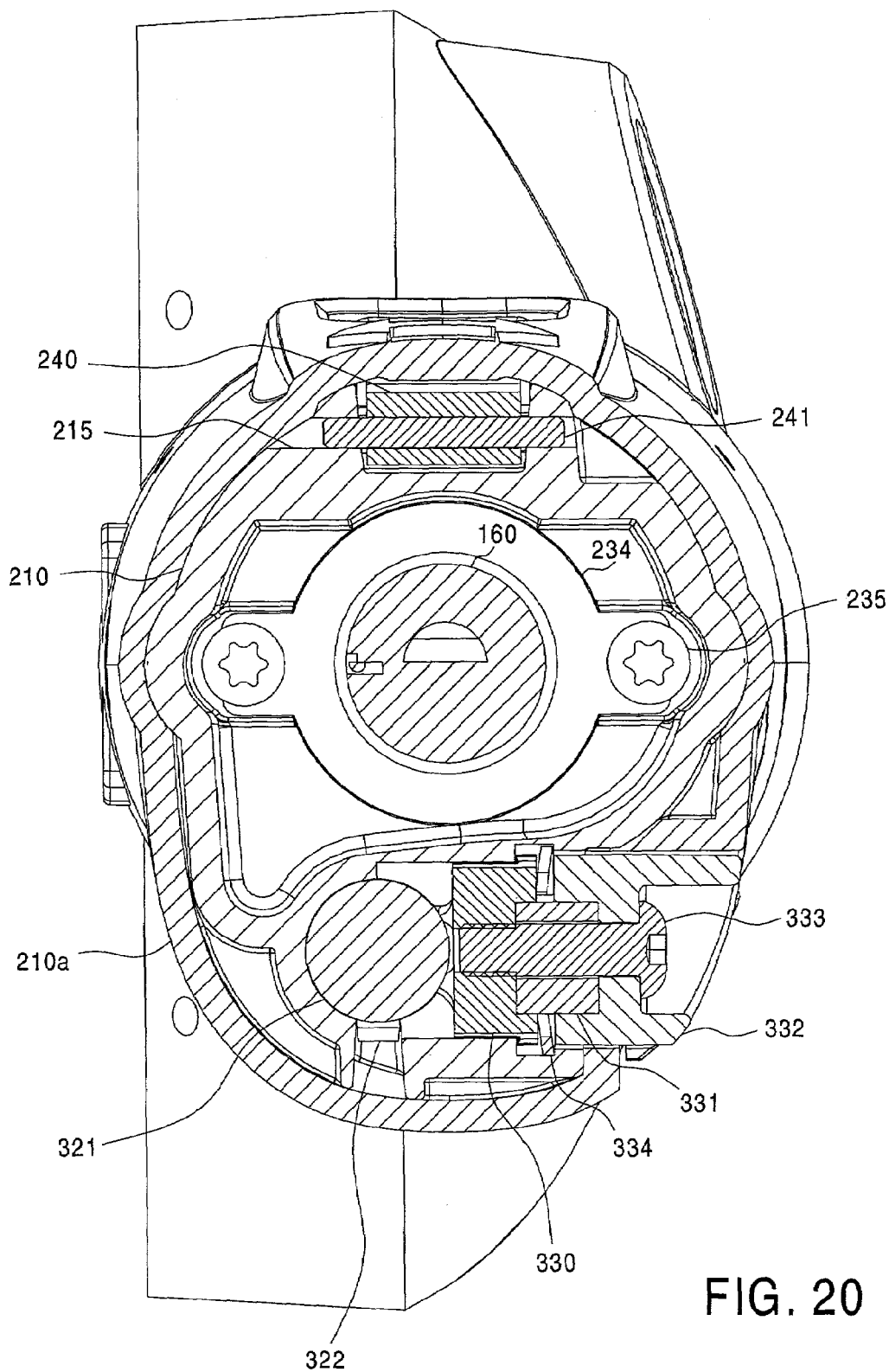
FIG. 20 is a sectional view taken from plane 20—20 in FIG. 6.

With reference to FIGS. 19–23, the shoe assembly 300 will be described in detail. The shoe assembly 300 comprises a shoe 310 mounted on a stem 320. The shoe 310 is pivotally mounted to the stem 320 via a rivet 311. The shoe 310 assists in stabilizing the saw during cutting by resting against the workpiece. Because it is pivotally mounted, the shoe 310 can adjust to be square against the workpiece. As shown in FIGS. 18 and 20, a post 321 of stem 320 is mounted with a sliding fit in a receiving bore formed in the front of the saw. A pin 322 is mounted in a bore formed in post 321 and protrudes slightly from one side of the post 321. An axial groove matching the protrusion of the pin 322 from post 321 is formed in the receiving bore in the saw so that the post 321 cannot rotate inside of the receiving bore. Thus, the shoe 310 will always be in the correct angular orientation relative to the saw blade 30. In this embodiment, post 321 is generally cylindrical in shape. However, post 321 can take any appropriate form such as a square bar, or even a flat or stamped plate. The receiving bore can be easily adapted to fit the shape of the post.

The axial position of the shoe 310 relative to the saw blade 30 can be adjusted by sliding the post 321 into or out of the receiving bore in the saw. Axial adjustment of shoe 310 adjusts the depth to which the saw blade 30 extends through the workpiece. Axial adjustment of shoe 310 also exposes different areas of the saw blade 30 to cutting in order to extend the life of the saw blade. A feature of this embodiment is that the adjustment of the shoe is "keyless," i.e. the post 321 can be slid into or out of the receiving bore without the use of tools.

As shown in FIG. 20, a locking mechanism 330 is mounted in the scroll housing 210. The locking mechanism 330 selectively engages the post 321 holding it in the receiving bore. Mounted to the locking mechanism are an adapter 331 and a lever 332. The lever 332 could take the form of a knob or other shape. The adapter 331 is assembled to the locking mechanism 330 after the locking mechanism is positioned in the scroll housing 210 and a locking ring 334 has been used to hold the locking mechanism 330 in place. The adapter 331 and the lever 332 are then mounted to the locking mechanism 330 via a screw 333. The lever 332 protrudes from the scroll housing 210 and is actuated by the user's hand. When the lever 332 is rotated, the adapter 331 and locking mechanism 330 are rotated in unison therewith. In this embodiment, the rotational axis of the locking mechanism 330 is generally perpendicular to the axis of motion of the post 321 and intersects the post. In this embodiment, the rotational axis of the locking mechanism also intersects the cylindrical axis of the cylindrically-shaped post 321.

Figure 21A:
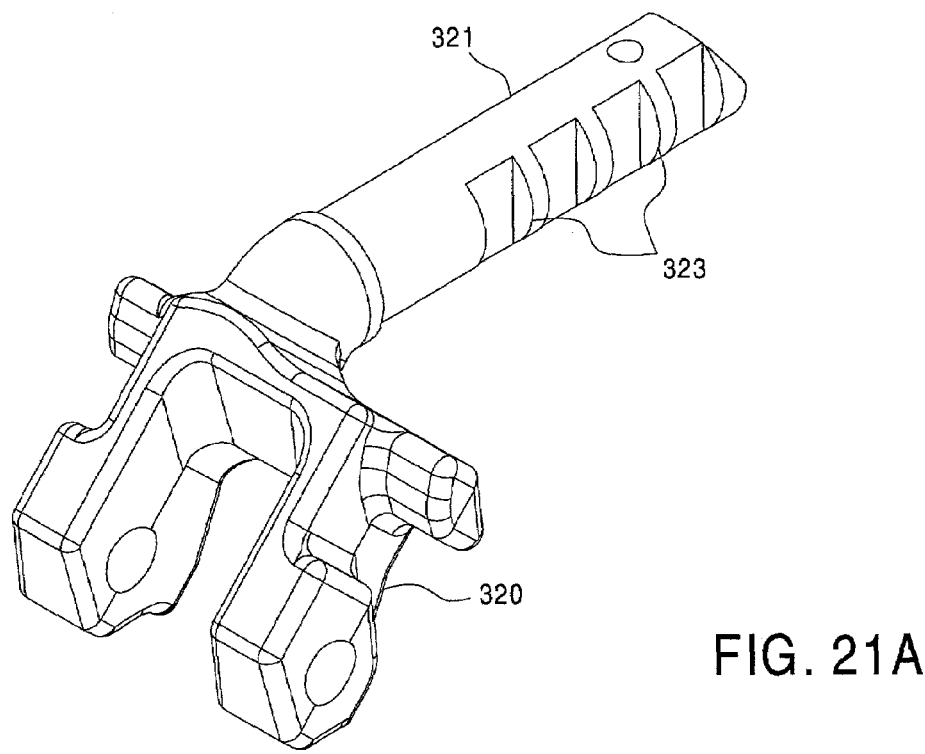
FIGS. 21A and 21B are isometric views of the stem 320 of FIG. 19.
Figure 21B:
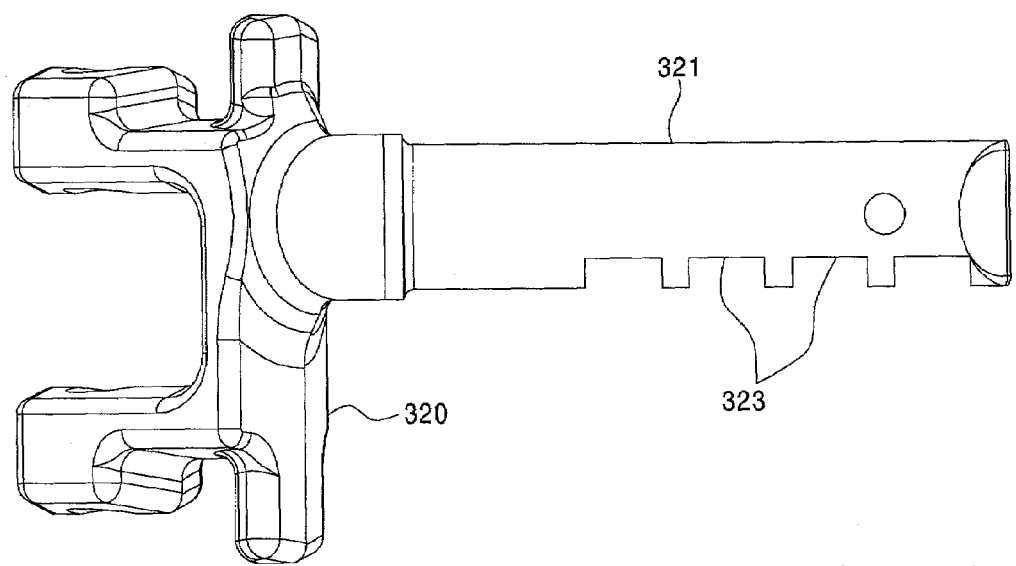
Figure 22:
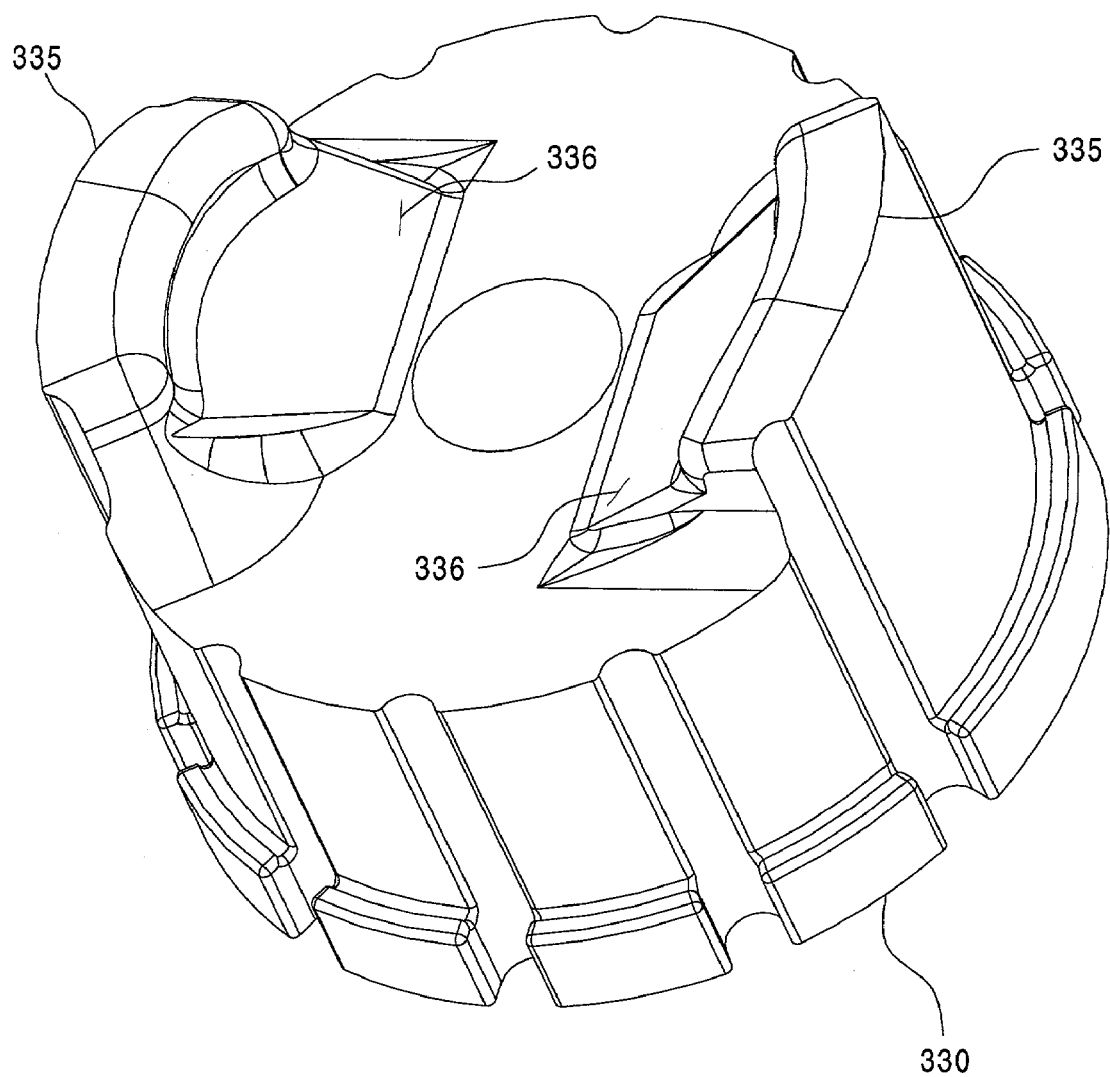
FIG. 22 is an isometric view of the locking mechanism 330 of FIG. 19.
Figure 23A:
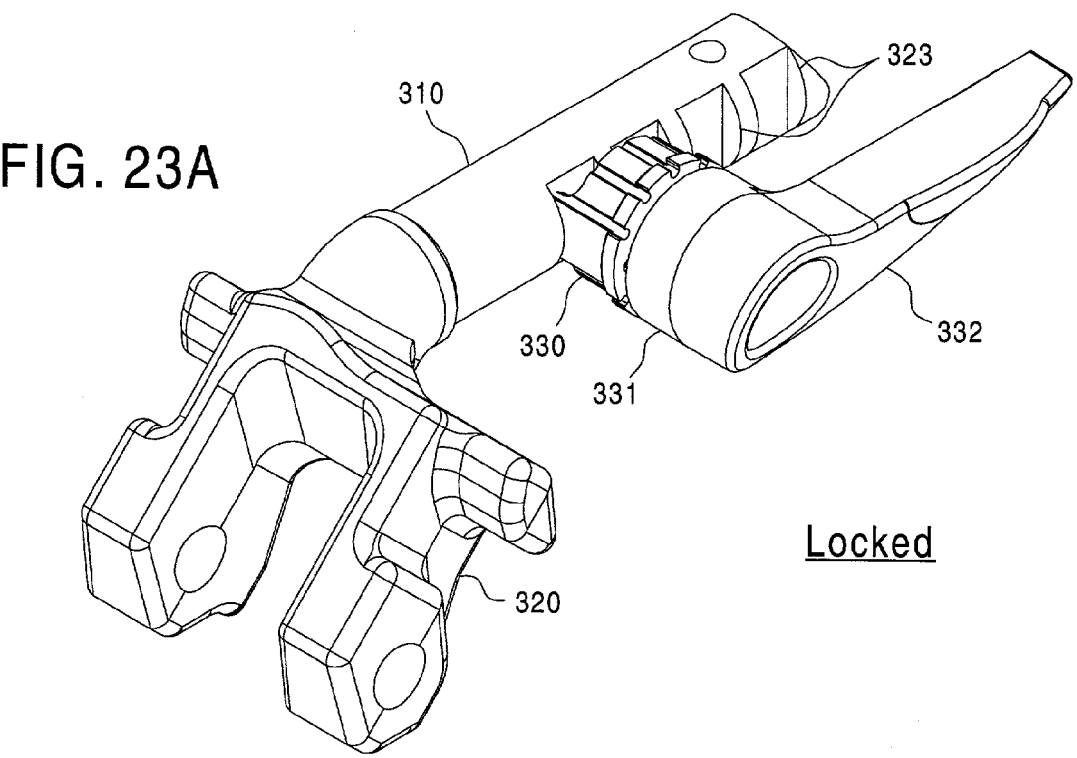
FIGS. 23A and 23B are assembly views of the rotation lock components of FIG. 19 shown in locked and unlocked positions, respectively.
Figure 23B:
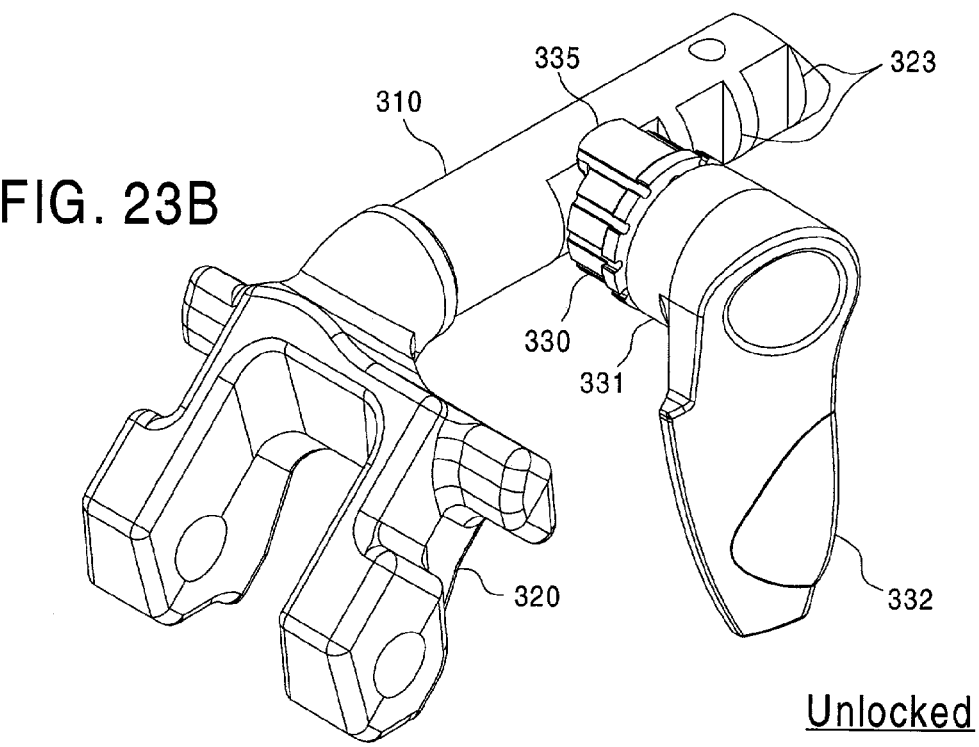

FIGS. 21A and 21B illustrate detents 323 formed along the length of post 321. FIG. 22 illustrates protrusions 335 formed on one axial end of the locking mechanism 330 extending axially therefrom. Two protrusions 335 are formed on the locking mechanism in the illustrated embodiment, but use of a single protrusion is also possible. The two protrusions 335 are angularly spaced 180° from one another around the rotational axis of the locking mechanism 330. The protrusions 335 are sized to engage in the detents 323. This embodiment has two protrusions 335 but a single protrusion may be used, if desired. The locking mechanism 330 has two positions in the scroll housing 210: a first position wherein the protrusions 335 engage the detents 323 and lock the post 321, and a second position wherein the protrusions 335 can bypass the detents 323 so that the post 321 can be slid axially in the receiving bore. FIGS. 23A and 23B illustrate the first position and the second position respectively. FIG. 23A illustrates the first position where the protrusions 335 engage the detents 323 and lock the post 321 in the receiving bore. FIG. 23B illustrates the second position where the protrusions bypass the detents 323 so that the post can be slid axially in the receiving bore to adjust the position of the shoe 310.

Ramped portions 336 are also formed on the axial end of the locking mechanism 330 adjacent the protrusions 335. Ramped portions 336 act as cams when the locking mechanism 330 is rotated and the detents 323 are not properly aligned with the protrusions 335. The detents 323 and post 321 are cammed by the ramped portions 336 into proper alignment with the protrusions 335. Without this feature, the user would be required to accurately align the post 321 with the locking mechanism 330 before locking the post 321. Such an operation would be difficult and would likely require both of the user's hands to adjust the post 321 and simultaneously turn the lever 332. Because the ramped portions 336 automatically cam the post 321 into the proper alignment, this difficult operation is obviated.

In order to adjust the axial position of the shoe 310, the user will rotate the lever 332 to unlock the locking mechanism 330 from the post 321. Then, the axial position of the shoe 310 can be adjusted by pushing or pulling the post 321 into or out of the receiving bore. Finally, the lever 332 will be rotated back to its first position. In so doing, the axial position of the post 321 will be finely adjusted (if necessary) by the ramped portions 336 until the post 321 is properly aligned with the locking mechanism 330. The protrusions 335 will then be engaged with the detents 323 and the post 321 will again be locked. The entire adjustment can be accomplished with a single hand.

A particular embodiment of an adaptable reciprocating saw has been illustrated and described in order to explain the principles and features of the invention. However, the scope of the invention is not limited by this particular embodiment. Those skilled in the art will recognize variations which do not depart from the scope of the invention which is defined in the appended claims.

We claim:

1. A reciprocating saw comprising:
   a housing;
   a rotary motor positioned inside the housing;
   the housing comprising a first housing portion including a handle portion with a power switch for controlling the rotary motor, and a second housing portion rotatably mounted to and rotatable relative to the first housing portion about a first axis of rotation;
   at least one of the first housing portion or the second housing portion having a radial groove formed thereon, the radial groove being centered substantially on the first axis of rotation, the other of the first housing portion or the second housing portion having a projection formed thereon engaging with the radial groove, the radial groove and the projection acting to axially lock the first housing portion relative to the second housing portion;
   a reciprocating mechanism driven by the rotary motor, the reciprocating mechanism converting rotary motion of the rotary motor into reciprocating motion;
   a reciprocating shaft having a reciprocating motion relative to the second housing portion, the reciprocating motion being driven by the reciprocating mechanism and defining a reciprocating motion axis, the first axis of rotation being substantially parallel to the reciprocating motion axis, the reciprocating shaft comprising:
     a first end extending from the second housing portion, a blade holder capable of holding a saw blade mounted on the first end; and
     a second end inside the housing and connected to the reciprocating mechanism;
   wherein the rotation of the second housing portion causes the blade holder to rotate in unison therewith; and
   wherein the first housing portion comprises a stationary housing portion, and a rotatable housing portion rotatably mounted to the stationary housing portion to rotate about a second axis of rotation substantially normal to the first axis of rotation.

2. The reciprocating saw of claim 1 wherein the electric motor is mounted to the first housing portion and rotates relative to the second housing portion in unison with the first housing portion.

3. The reciprocating saw of claim 1 further comprising:
   an adjustable shoe mounted to the second housing portion, the mounted position of the adjustable shoe relative to the second housing portion being adjustable in a direction substantially parallel to the reciprocating motion axis.

4. The reciprocating saw of claim 3 wherein the mounted position of the adjustable shoe can be adjusted without the use of any tool.

5. A reciprocating saw comprising:
   a first housing having a handle portion and a motor portion for mounting a rotary electric motor;
   a second housing rotationally mounted to the first housing;
   a third housing rotationally mounted to the second housing;
   a reciprocating shaft extending out from the third housing, the reciprocating shaft having a reciprocating motion defining a reciprocating motion axis; wherein
   the second housing is rotationally mounted to the first housing about a first axis of rotation substantially perpendicular to the reciprocating motion axis; and the third housing is rotationally mounted to the second housing about a second axis of rotation substantially parallel to the reciprocating motion axis.

6. The reciprocating saw of claim 5 wherein the third housing rotates endlessly in either direction about the second axis of rotation.

7. The reciprocating saw of claim 5 further comprising:
   a radial flange centered on the second axis of rotation formed on one of the second housing or third housing and extending at least part way around the second axis of rotation;
   a locking piece detachably mounted to the other of the second housing or third housing; and
   wherein the locking piece engages the radial flange thereby blocking appreciable axial movement of the third housing away from the second housing.

8. The reciprocating saw of claim 5 wherein the second housing is formed substantially of aluminum through a die casting process.

9. The reciprocating saw of claim 5 wherein the third housing is formed substantially of aluminum through a die casting process.

10. The reciprocating saw of claim 5 wherein the second housing and the third housing are each formed substantially of aluminum through a die casting process.

11. The reciprocating saw of claim 5 further comprising:
    a first boot mounted to the second housing;
    a second boot mounted to the third housing;
    wherein the first boot and the second boot are formed of an electrically insulating material.

12. The reciprocating saw of claim 11 wherein the first and the second boot are formed from thermoplastic elastomer.

13. The reciprocating saw of claim 11 wherein the first boot completely surrounds the exterior of the second housing and the second boot completely surrounds the exterior of the third housing thereby preventing a user's hand from directly contacting the second or third housing.

14. A method of fastening first and second housing portions of a power tool where the first and second housing portions rotate relative to one another, the method comprising:
assembling the first and second housing portions together so that bearing surfaces formed on each are engaged with one another; and
mounting one or more detachable locking pieces onto one of the first or second housing portions so that the locking pieces engage a surface formed on the other of the first or second housing portions thereby permitting relative rotational movement between the first and second housing portions about an axis of rotation and blocking relative axial movement of the first housing portion away from the second housing portion
wherein mounting one or more locking pieces onto one of the first or second housing portions further comprises pushing the locking pieces into an interference fit with the one of the first or second housing portions.

15. The method of claim 14 wherein:
the first housing portion is a portion of a housing of a reciprocating saw comprising a handle portion and at least partially enclosing a motor for driving the reciprocating saw;
the second housing portion is a portion of a housing of a reciprocating saw at least partially enclosing a reciprocating shaft which defines a reciprocating motion axis; and
the axis of rotation is generally perpendicular to the reciprocating motion axis of the reciprocating shaft.

16. The method of claim 14 wherein:
the first housing portion is a portion of a housing of a reciprocating saw comprising a handle portion and at least partially enclosing a motor for driving the reciprocating saw;
the second housing portion is a portion of a housing of a reciprocating saw at least partially enclosing a reciprocating shaft which defines a reciprocating motion axis; and
the axis of rotation is generally parallel to the reciprocating motion axis of the reciprocating shaft.

17. A method of fastening first and second housing portions of a power tool where the first and second housing portions rotate relative to one another, the method comprising:
assembling the first and second housing portions together so that bearing surfaces formed on each are engaged with one another; and
mounting one or more detachable locking pieces onto one of the first or second housing portions so that the locking pieces engage a surface formed on the other of the first or second housing portions thereby permitting relative rotational movement between the first and second housing portions about an axis of rotation and blocking relative axial movement of the first housing portion away from the second housing portion;
wherein the one or more locking pieces comprise one or more pins.

18. The method of claim 17 wherein mounting one or more locking pieces onto one of the first or second housing portions further comprises:
positioning at least one O-ring around each of the one or more pins; and
positioning each of the one or more pins with an attached O-ring into a respective bore formed in the one of the first or second housing portions so that each O-ring is interposed between the respective pin and bore thereby aiding to retain the position of the pin in the bore.

19. The method of claim 18 wherein the one or more pins comprise a first pin and a second pin.

20. The method of claim 19 wherein:
the first housing portion is a portion of a housing of a reciprocating saw comprising a handle portion and at least partially enclosing a motor for driving the reciprocating saw;
the second housing portion is a portion of a housing of a reciprocating saw at least partially enclosing a reciprocating shaft which defines a reciprocating motion axis; and
the axis of rotation is generally perpendicular to the reciprocating motion axis of the reciprocating shaft.

21. The method of claim 19 wherein:
the first housing portion is a portion of a housing of a reciprocating saw comprising a handle portion and at least partially enclosing a motor for driving the reciprocating saw;
the second housing portion is a portion of a housing of a reciprocating saw at least partially enclosing a reciprocating shaft which defines a reciprocating motion axis; and
the axis of rotation is generally parallel to the reciprocating motion axis of the reciprocating shaft.

* * * * *